US011889907B2

(12) United States Patent
Inoue et al.

(10) Patent No.: US 11,889,907 B2
(45) Date of Patent: Feb. 6, 2024

(54) DISCHARGE DEVICE AND HAIR CARE DEVICE

(71) Applicant: Panasonic Intellectual Property Management Co., Ltd., Osaka (JP)

(72) Inventors: Hiroyuki Inoue, Shiga (JP); Yohei Ishigami, Osaka (JP); Masato Kinoshita, Shiga (JP); Aya Ishihara, Osaka (JP); Yasunori Matsui, Shiga (JP); Hayato Kikuchi, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 426 days.

(21) Appl. No.: 17/260,497

(22) PCT Filed: Feb. 4, 2019

(86) PCT No.: PCT/JP2019/003843
§ 371 (c)(1),
(2) Date: Jan. 14, 2021

(87) PCT Pub. No.: WO2020/044591
PCT Pub. Date: Mar. 5, 2020

(65) Prior Publication Data

US 2021/0315349 A1 Oct. 14, 2021

(30) Foreign Application Priority Data

Aug. 29, 2018 (JP) ................................ 2018-160761

(51) Int. Cl.
*A45D 20/12* (2006.01)
*A45D 20/50* (2006.01)
(Continued)

(52) U.S. Cl.
CPC ............ *A45D 20/12* (2013.01); *A45D 20/50* (2013.01); *B05B 5/001* (2013.01); *B05B 5/057* (2013.01);
(Continued)

(58) Field of Classification Search
CPC .. A45D 20/12; A45D 20/50; A45D 2200/202; B05B 5/001; B05B 5/057;
(Continued)

(56) References Cited

U.S. PATENT DOCUMENTS

2009/0078800 A1* 3/2009 Nakasone .............. B05B 5/001 239/690
2018/0034248 A1 2/2018 Ishigami et al.
2019/0111405 A1* 4/2019 Katano .................. A61L 2/202

FOREIGN PATENT DOCUMENTS

CN 107681470 A 2/2018
EP 3280013 A1 2/2018
(Continued)

OTHER PUBLICATIONS

International Search Report issued in corresponding International Patent Application No. PCT/JP2019/003843, dated May 14, 2019, with English translation.
(Continued)

*Primary Examiner* — John P McCormack
(74) *Attorney, Agent, or Firm* — Rimon P.C.

(57) ABSTRACT

A discharge device includes a discharge electrode, a counter electrode that faces the discharge electrode in a first direction, and voltage application unit that applies an application voltage between the discharge electrode and the counter electrode. The counter electrode includes a dome-shaped electrode having a recessed inner surface recessed to a side opposite to the discharge electrode in the first direction, and a protruding electrode that protrudes in a second direction
(Continued)

intersecting the first direction from an opening edge of an opening of the dome-shaped electrode, the opening being provided at an end opposite to the discharge electrode. The discharge device forms a discharge path having at least partial dielectric breakdown between the discharge electrode and the protruding electrode, when the discharge occurs. The discharge path includes a first dielectric breakdown region generated around the discharge electrode and a second dielectric breakdown region generated around the protruding electrode.

16 Claims, 10 Drawing Sheets

(51) Int. Cl.
*B05B 5/00* (2006.01)
*B05B 5/057* (2006.01)
*B05B 5/16* (2006.01)

(52) U.S. Cl.
CPC ...... *B05B 5/1691* (2013.01); *A45D 2200/202* (2013.01)

(58) Field of Classification Search
CPC ....... B05B 5/1691; B05B 5/03; B05B 5/0535; B05B 5/025; B05B 15/14; H01T 23/00; H01T 19/04; H05H 1/481
USPC .............................................................. 34/97
See application file for complete search history.

(56) References Cited

FOREIGN PATENT DOCUMENTS

| | | | |
|---|---|---|---|
| JP | 2009-216284 A | | 9/2009 |
| JP | 2010-213739 A | | 9/2010 |
| JP | 2014-231047 A | | 12/2014 |
| JP | 2014231047 A | * | 12/2014 |
| WO | 2018/025684 A1 | | 2/2018 |

OTHER PUBLICATIONS

English Translation of Chinese Search Report dated Jul. 16, 2021 for the related Chinese Patent Application No. 201980054833.7.

Extended European Search Report dated Sep. 21, 2021 for the related European Patent Application No. 19855758.9.

* cited by examiner

DISCHARGE DEVICE AND HAIR CARE DEVICE

CROSS-REFERENCE OF RELATED APPLICATIONS

This application is the U.S. National Phase under 35 U.S.C. § 371 of International Patent Application No. PCT/JP2019/003843, filed on Feb. 4, 2019, which in turn claims the benefit of Japanese Application No. 2018-160761, filed on Aug. 29, 2018, the entire disclosures of which Applications are incorporated by reference herein.

TECHNICAL FIELD

The present disclosure relates to a discharge device and a hair care device including the discharge device. In particular, the present disclosure relates to a discharge device including a discharge electrode and a counter electrode, and a hair care device including the discharge device.

BACKGROUND ART

Conventionally, an electrostatic atomizer that produces charged fine particle water is known (see, for example, PTL 1). The electrostatic atomizer disclosed in PTL 1 includes a discharge electrode having a tip and a counter electrode located to face the tip. The electrostatic atomizer supplies water to the discharge electrode and applies a voltage, thereby generating charged fine particle water using the water supplied to the discharge electrode. The charged fine particle water contains an active ingredient such as a radical.

When the electrostatic atomizer (discharge device) disclosed in PTL 1 is applied to, for example, a hair dryer, it is desired to generate charged fine particle water containing large amounts of acidic components such as nitrate ions and nitrogen oxides.

CITATION LIST

Patent Literature

PTL 1: Unexamined Japanese Patent Publication No. 2014-231047

SUMMARY OF THE INVENTION

The present disclosure provides a discharge device and a hair care device capable of increasing a produced amount of acidic components.

The discharge device according to one aspect of the present disclosure includes a discharge electrode, a counter electrode, and a voltage application unit. The counter electrode faces the discharge electrode in a first direction. The voltage application unit generates a discharge by applying an application voltage between the discharge electrode and the counter electrode. The counter electrode includes a dome-shaped electrode and a protruding electrode. The dome-shaped electrode has a recessed inner surface that is recessed to a side opposite to the discharge electrode in the first direction. The protruding electrode protrudes in a second direction intersecting the first direction from an opening edge of an opening of the dome-shaped electrode, the opening being provided at an end opposite to the discharge electrode. When a discharge occurs, the discharge device forms a discharge path having at least partial dielectric breakdown between the discharge electrode and the protruding electrode. The discharge path includes a first dielectric breakdown region and a second dielectric breakdown region. The first dielectric breakdown region is generated around the discharge electrode. The second dielectric breakdown region is generated around the protruding electrode.

The hair care device according to one aspect of the present disclosure includes the abovementioned discharge device and an airflow generator that generates an airflow with respect to the discharge device.

According to the present disclosure, it is possible to achieve a discharge device and a hair care device capable of increasing a produced amount of acidic components.

DESCRIPTION OF EMBODIMENT

Figure 1:
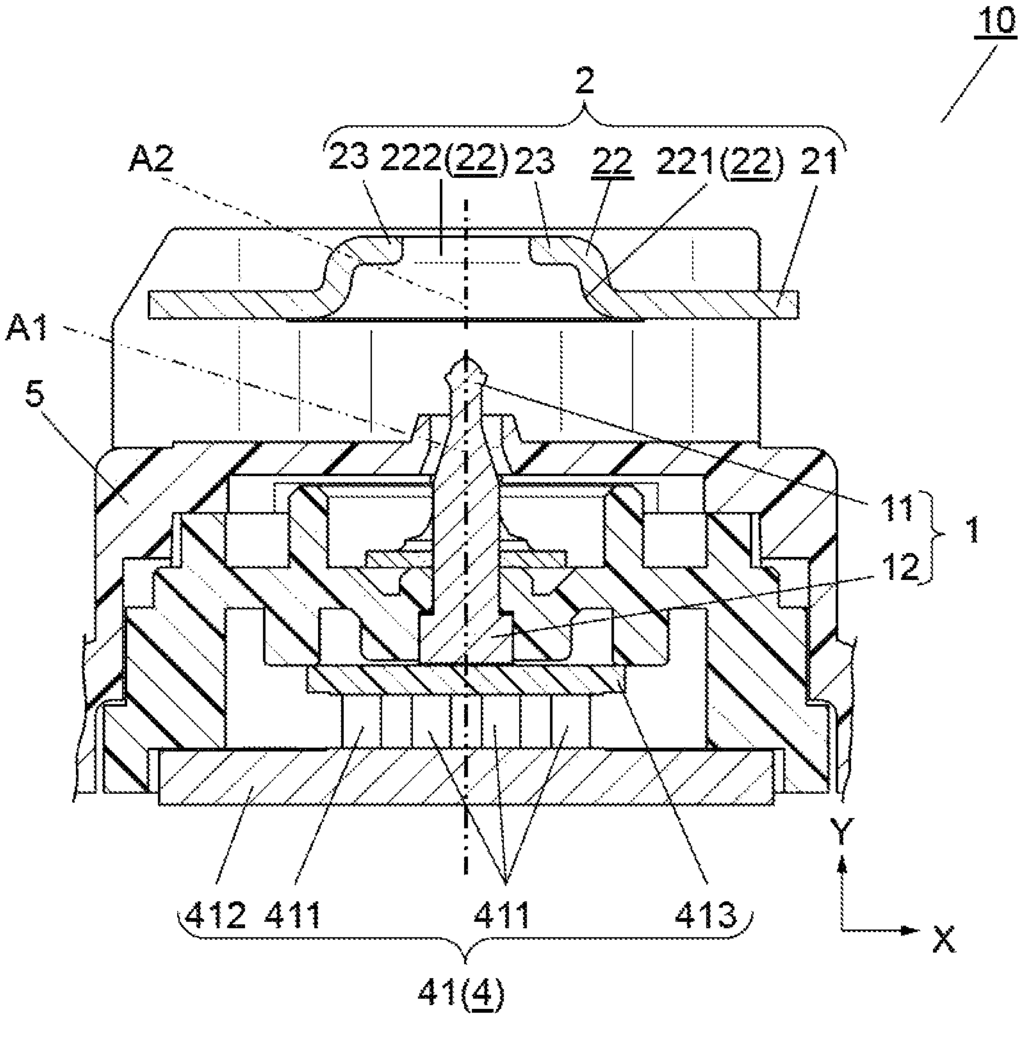
FIG. 1 is a sectional view of a discharge device according to an exemplary embodiment.

An exemplary embodiment and modifications described below are merely examples of the present disclosure. The present disclosure is not limited to the exemplary embodiment and modifications, and besides the following exemplary embodiment and modifications, various changes are possible depending on design or the like without departing from the scope of the technical idea of the present disclosure. Drawings used in the following exemplary embodiment and modifications are schematic, and a dimensional ratio or thickness ratio of components in the drawings may not reflect an actual dimensional ratio.

Exemplary Embodiment

A discharge device and a hair care device according to the present exemplary embodiment will be described below separately for each item.

(1) Overview

An overview of discharge device 10 and hair care device 100 according to the present exemplary embodiment will now be described with reference to FIGS. 1, 2A, and 2B.

In the following description, a lateral direction of discharge device 10 is defined as an X-axis direction (or a second direction), a front-rear direction is defined as a Y-axis direction (or a first direction), and a vertical direction is defined as a Z-axis direction. Further, the rightward direction of discharge device 10 is defined as the positive direction of the X-axis, and the leftward direction is defined as the negative direction of the X-axis. Further, the forward direction of discharge device 10 is defined as the positive direction of the Y-axis, and the rearward direction is defined as the negative direction of the Y-axis. Further, the upward direction of discharge device 10 is defined as the positive direction of the Z-axis, and the downward direction is defined as the negative direction of the Z-axis.

As shown in FIG. 1, discharge device 10 according to the present exemplary embodiment includes discharge electrode 1, counter electrode 2, voltage application unit 3 (see FIG. 3), liquid supply unit 4 (see FIG. 3), and the like. Counter electrode 2 faces discharge electrode 1 in the first direction. In the present exemplary embodiment, the first direction indicates the front-rear direction (Y-axis direction). Voltage application unit 3 generates a discharge by applying an application voltage between discharge electrode 1 and counter electrode 2. Liquid supply unit 4 has a function of supplying liquid 40 (see FIG. 6A) to discharge electrode 1. Counter electrode 2 includes dome-shaped electrode 22, protruding electrode 23, and the like.

Figure 2A:
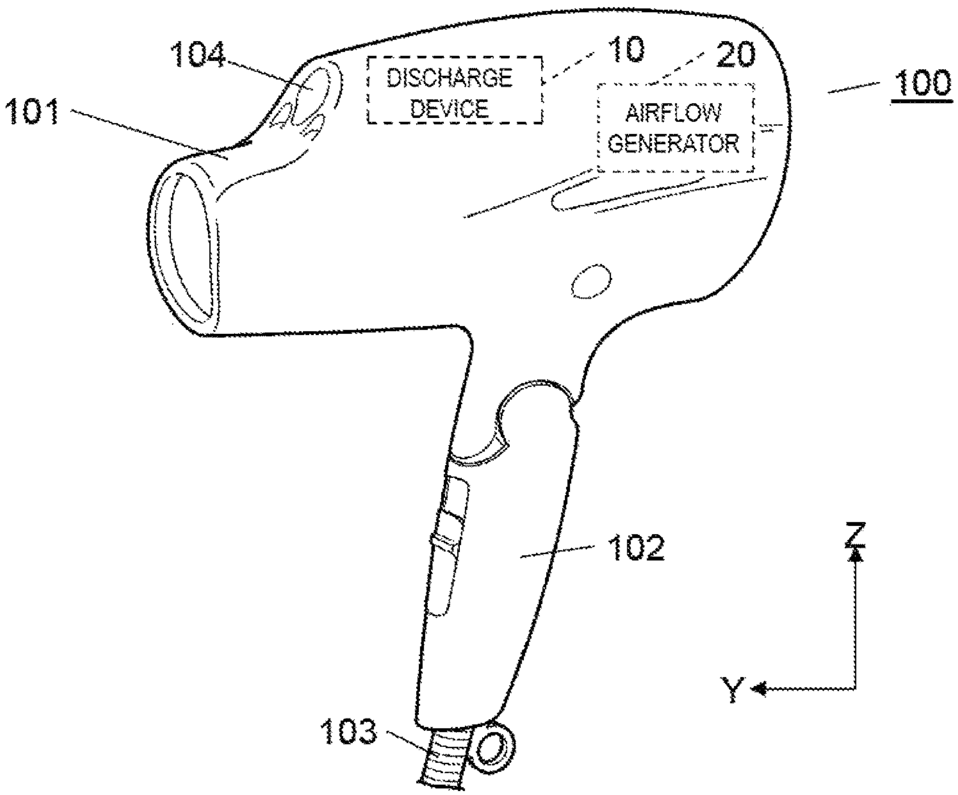
FIG. 2A is a perspective view of a hair care device according to the exemplary embodiment.
Figure 2B:
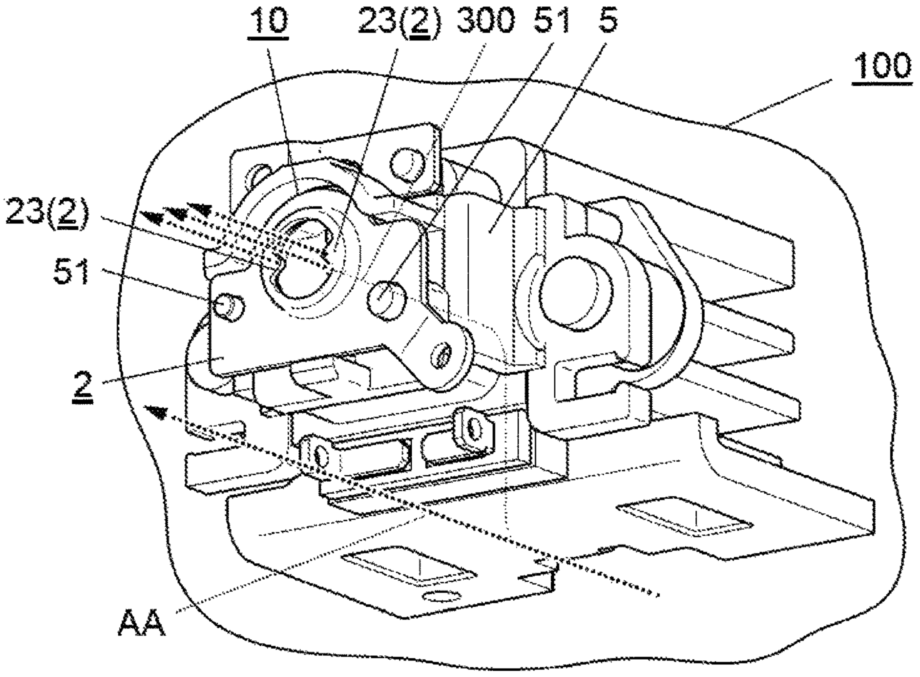
FIG. 2B is a perspective view showing a main part of the hair care device.

In the present exemplary embodiment, counter electrode 2 includes, for example, a pair of protruding electrodes 23 as shown in FIGS. 1 and 2B. That is, counter electrode 2 includes a plurality of protruding electrodes 23, and the plurality of protruding electrodes 23 includes at least a pair of protruding electrodes 23.

As shown in FIG. 1, dome-shaped electrode 22 has recessed inner surface 221 recessed to a side opposite to discharge electrode 1 in the first direction. Protruding electrodes 23 are provided so as to protrude in the second direction from opening edge 222*a* (for example, see FIG. 4A) of opening 222 of dome-shaped electrode 22 formed on an end opposite to discharge electrode 1. Here, the second direction indicates a direction that intersects the first direction, and in the present exemplary embodiment, it indicates the lateral direction (X-axis direction).

Notably, it is sufficient that discharge device 10 includes, as minimum components, discharge electrode 1, counter electrode 2, and voltage application unit 3. Therefore, liquid supply unit 4 may not be included in the components of discharge device 10.

Further, as shown in FIG. 2A, hair care device 100 according to the present exemplary embodiment includes discharge device 10, airflow generator 20, and the like. Airflow generator 20 generates an airflow with respect to discharge device 10. In a case where counter electrode 2 includes a plurality of protruding electrodes 23 as in the present exemplary embodiment, the plurality of protruding electrodes 23 is preferably provided in flow path 300 of an airflow generated by airflow generator 20 and at positions where the airflow flows at the same velocity, as shown in FIG. 2B. Here, the “positions where the airflow flows at the same velocity” described in the present disclosure does not mean positions where the airflow flows at exactly the same velocity. For example, the “positions where the airflow flows at the same velocity” includes positions where the airflow flows at different velocities that do not affect the frequency of discharge in the plurality of protruding electrodes 23.

Further, in discharge device 10, a voltage is applied by voltage application unit 3 between discharge electrode 1 and counter electrode 2, while, for example, liquid 40 is adhered to and retained on the surface of discharge electrode 1. As a result, a discharge is generated between discharge electrode 1 and counter electrode 2, so that liquid 40 retained on discharge electrode 1 is electrostatically atomized by the discharge. In other words, discharge device 10 according to the present exemplary embodiment constitutes a so-called electrostatic atomizer. Here, in the present disclosure, liquid 40 retained on discharge electrode 1, that is, liquid 40 to be electrostatically atomized, may be simply referred to as “liquid 40”.

Figure 3:
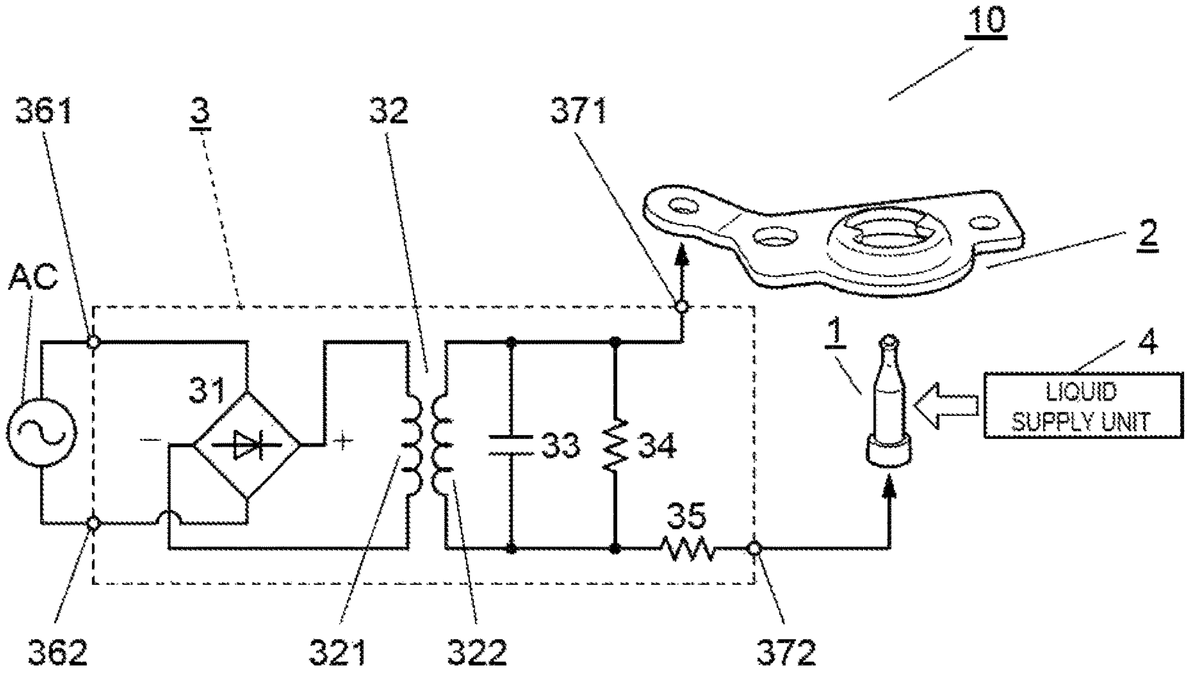
FIG. 3 is a schematic circuit diagram of the discharge device.

As shown in FIG. 3, voltage application unit 3 applies an application voltage between discharge electrode 1 and counter electrode 2. Thus, a discharge is generated between discharge electrode 1 and counter electrode 2. In particular, in the present exemplary embodiment, voltage application unit 3 applies the application voltage such that the magnitude of the application voltage applied between discharge electrode 1 and counter electrode 2 varies periodically. Accordingly, a discharge is intermittently generated between discharge electrode 1 and counter electrode 2. At this time, mechanical vibration occurs in liquid 40 due to the periodic variation of the application voltage. Here, the “application voltage” described in the present disclosure means a voltage applied between discharge electrode 1 and counter electrode 2 by voltage application unit 3 in order to generate a discharge.

Figure 6A:
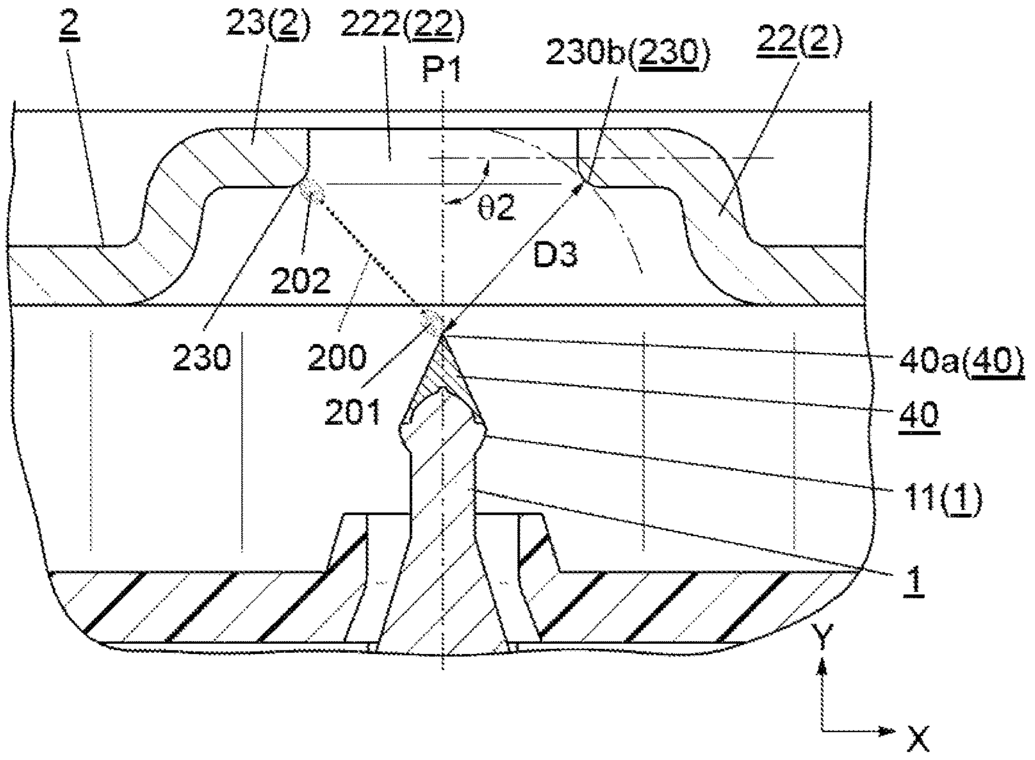
FIG. 6A is a conceptual diagram for describing a partial breakdown discharge generated in the discharge device.

As will be described in detail later, due to application of a voltage (application voltage) between discharge electrode 1 and counter electrode 2, liquid 40 retained on discharge electrode 1 is formed into a conical shape called a Taylor cone by receiving force due to an electric field as shown in FIG. 6A. Therefore, the electric field is concentrated on tip 40*a* (vertex) of the Taylor cone. In this case, the sharper tip 40*a* of the Taylor cone, that is, the smaller (the more acute) the vertex angle of the cone, the smaller the electric field strength required for dielectric breakdown. As a result, it becomes easy to generate a discharge between discharge electrode 1 and counter electrode 2 with weak electric field strength.

Further, liquid 40 retained on discharge electrode 1 is alternately deformed into a first shape and a second shape by the mechanical vibration. The first shape indicates the shape of the Taylor cone shown in FIG. 6A. The second shape indicates a shape in which tip 40*a* (vertex) of the Taylor cone is crushed (not shown). As a result, the shape of the Taylor cone described above is periodically formed. Therefore, a discharge is intermittently generated between discharge electrode 1 and counter electrode 2 at the timing at which the Taylor cone shown in FIG. 6A is formed.

Further, in discharge device 10, discharge electrode 1 and protruding electrode 23 of counter electrode 2 are disposed to face each other with a gap therebetween in the first direction (Y-axis direction). Then, when the application voltage is applied between discharge electrode 1 and protruding electrode 23 of counter electrode 2 by voltage application unit 3, a discharge is generated. At this time, when a discharge occurs, discharge path 200 (see FIG. 6A) is formed in which dielectric breakdown partially occurs in at least a part of a region between discharge electrode 1 and protruding electrode 23. Formed discharge path 200 includes first dielectric breakdown region 201 and second dielectric breakdown region 202. First dielectric breakdown region 201 is generated around discharge electrode 1. Second dielectric breakdown region 202 is generated around protruding electrode 23. That is, discharge path 200 in which dielectric breakdown occurs not entirely but partially (locally) is formed between discharge electrode 1 and protruding electrode 23 of counter electrode 2.

The "dielectric breakdown" described in the present disclosure means that electrical insulation of an insulator (including gas) separating conductors is broken, and the insulating state cannot be maintained. Specifically, in a case of dielectric breakdown of a gas, for example, ionized molecules are accelerated by an electric field and collide with other gas molecules to be ionized. Then, the ion concentration suddenly increases to cause a gas discharge, so that dielectric breakdown occurs. That is, in discharge device 10 according to the present exemplary embodiment, when a discharge occurs, the gas (air) present in the path connecting discharge electrode 1 and protruding electrodes 23 has dielectric breakdown locally, that is, only in a part thereof. Thus, discharge path 200 formed between discharge electrode 1 and protruding electrode 23 does not reach entire dielectric breakdown, but only has partial dielectric breakdown.

In this case, discharge path 200 includes first dielectric breakdown region 201 generated around discharge electrode 1 and second dielectric breakdown region 202 generated around protruding electrode 23 of counter electrode 2 as described above. First dielectric breakdown region 201 indicates a region where dielectric breakdown occurs around discharge electrode 1, and second dielectric breakdown region 202 indicates a region where dielectric breakdown occurs around protruding electrode 23. Then, first dielectric breakdown region 201 and second dielectric breakdown region 202 are generated in distant regions of discharge path 200 so as not to come into contact with each other. In other words, in discharge path 200, first dielectric breakdown region 201 and second dielectric breakdown region 202 are separated from each other. Therefore, discharge path 200 includes a region (insulation region) where dielectric breakdown does not occur at least between first dielectric breakdown region 201 and second dielectric breakdown region 202. Thus, discharge path 200 between discharge electrode 1 and protruding electrode 23 includes a region where dielectric breakdown occurs partially while keeping an insulation region in at least a part thereof. As a result, discharge path 200 is formed in a state where the electrical insulation is lowered.

As described above, according to discharge device 10, discharge path 200 in which dielectric breakdown occurs not entirely but partially is formed between discharge electrode 1 and protruding electrode 23 of counter electrode 2. With this configuration, even when discharge path 200 in which partial dielectric breakdown occurs, in other words, discharge path 200 including a region where dielectric breakdown does not occur in a part thereof, is used, a current flows between discharge electrode 1 and protruding electrode 23 through discharge path 200, and thus, a discharge occurs.

Note that the discharge in a mode in which discharge path 200 having partial dielectric breakdown is formed will be referred to as "partial breakdown discharge" below. The partial breakdown discharge will be described in detail in the section of "(2.4) Partial breakdown discharge".

Here, the partial breakdown discharge generates a large amount of energy as compared with a corona discharge. Therefore, in the partial breakdown discharge, oxygen and nitrogen in the air chemically react with each other to generate an acidic component such as nitrogen oxide. When attached to, for example, skin, the generated acidic component makes the skin mildly acidic. Therefore, the acidic component accelerates, in the skin, the production of moisturizing ingredients such as natural moisturizing molecules and intercellular lipids. In other words, the acidic component has an effect of boosting the ability of the skin to retain moisture. In addition, the acidic component tightens cuticle that covers the surface of the hair. That is, the acidic component also has an effect of preventing discharge of water, nutrients, and the like from inside of the hair.

In addition, when acidic components are generated by the partial breakdown discharge, ozone is also generated simultaneously. However, discharge device 10 according to the present exemplary embodiment is configured such that an electric field is concentrated on the tip of protruding electrode 23. Therefore, a generated amount of ozone can be suppressed to the same extent as that in the corona discharge.

Further, in the partial breakdown discharge, large amounts of radicals about 2 to 10 times as much as that in the corona discharge are generated. The generated radicals are the basis for providing useful effects in various situations, besides sterilization, deodorization, moisture retention, freshness retention, and inactivation of viruses. Therefore, the generated radicals can also be effectively utilized.

On the other hand, apart from the partial breakdown discharge, there is a discharge in a mode in which a phenomenon where dielectric breakdown (entire breakdown) occurs due to development of a corona discharge is intermittently repeated. In the following description, the discharge in such a mode will be referred to as "entire breakdown discharge".

The entire breakdown discharge occurs by an operation described below.

First, when a corona discharge develops, and dielectric breakdown (entire breakdown) occurs, a relatively large discharge current flows instantaneously. Immediately after a large discharge current flows, the application voltage drops, and the discharge current is cut off. When the discharge current is cut off, the application voltage rises again, leading to dielectric breakdown. That is, the abovementioned phenomenon is repeated in the entire breakdown discharge. In this case, even in the entire breakdown discharge, a large amount of energy is also generated as compared with the corona discharge, as in the partial breakdown discharge. Therefore, acidic components such as nitrogen oxides are generated by the entire breakdown discharge. However, the energy generated by the entire breakdown discharge is much larger than the energy generated by the partial breakdown discharge. Thus, electrolytic corrosion of the electrodes (discharge electrode 1, protruding electrodes 23) due to the energy at the time of discharge becomes larger than that in the partial breakdown discharge. Therefore, considering the life of discharge device 10, it is preferable to limit the discharge to the partial breakdown discharge.

That is, in discharge device 10 according to the present exemplary embodiment, the partial breakdown discharge or the entire breakdown discharge is caused between discharge electrode 1 and protruding electrode 23 of counter electrode 2 that face each other in the first direction with a gap therebetween. With this configuration, the produced amount of acidic components can be increased as compared with the case of the corona discharge. Further, due to the electric field being concentrated on the tip of protruding electrode 23, the generated amount of ozone can be suppressed to the same extent as that in the corona discharge.

(2) Details

Hereinafter, discharge device 10 and hair care device 100 according to the present exemplary embodiment will be described in detail with reference to FIGS. 1 to 5.

(2.1) Hair Care Device

Hereinafter, a hair dryer shown in FIG. 2A will be described as an example of hair care device 100.

As shown in FIG. 2A, hair care device 100 includes discharge device 10, airflow generator 20, and the like. Hair care device 100 further includes casing 101, grip 102, power cord 103, and the like. Hair care device 100 may be a hair iron or the like.

Airflow generator 20 includes, for example, a small blower fan. Airflow generator 20 generates an airflow blown out from an opening of casing 101 using the outside air introduced by the blower fan. As shown in FIG. 2B, hair care device 100 according to the present exemplary embodiment is configured such that a part of the airflow generated by airflow generator 20 passes through counter electrode 2 of discharge device 10.

Casing 101 is made of a molded article formed using a synthetic resin such as ABS, and is formed in a tubular shape extending in the front-rear direction. Casing 101 is provided with vent hole 104 formed in the front surface, vent hole 104 penetrating housing 101 in the front-rear direction (Y-axis direction). Casing 101 houses inside discharge device 10, airflow generator 20, and the like. As described above, discharge device 10 generates the active ingredients (acidic components, radicals, charged fine particle water, etc.). The generated active ingredients are discharged to the outside of casing 101 through vent hole 104 by the airflow from airflow generator 20. Grip 102 is connected to a lower end of casing 101.

Similar to casing 101, grip 102 is made of a molded article formed using a synthetic resin such as ABS, and is formed in a tubular shape extending in the vertical direction. Grip 102 is connected to casing 101 so as to be movable (foldable) between a first position and a second position. The first position indicates a position in which the longitudinal direction of grip 102 is along the vertical direction (a direction intersecting the longitudinal direction of casing 101: the Z-axis direction) as shown in FIG. 2A. The second position indicates a position where the longitudinal direction of grip 102 is along the front-rear direction (a direction substantially parallel to the longitudinal direction of casing 101: the Y-axis direction).

As shown in FIG. 2A, hair care device 100 according to the present exemplary embodiment is supplied with AC power from the outside via power cord 103 extending downward from the lower end of grip 102. Then, discharge device 10, airflow generator 20, and the like of hair care device 100 are driven by the supplied AC power.

(2.2) Discharge Device

As shown in FIGS. 1 and 3, discharge device 10 includes discharge electrode 1, counter electrode 2, voltage application unit 3, liquid supply unit 4, and the like. Discharge electrode 1, counter electrode 2, voltage application unit 3, and liquid supply unit 4 are held in electrically insulating housing 5 made of a synthetic resin such as polycarbonate.

Discharge electrode 1 is composed of, for example, a rod-shaped electrode. Discharge electrode 1 has tip 11 at one end (upper end) in the longitudinal direction (vertical direction: Y-axis direction), and base end 12 on the other end (an end opposite to the tip, a lower end) in the longitudinal direction. Discharge electrode 1 is a needle-shaped electrode in which at least tip 11 has a tapered shape. Here, the "tapered shape" is not limited to a shape having a sharp tip, but also includes a shape having a rounded tip as shown in FIG. 1, etc. In the present exemplary embodiment, tip 11 of discharge electrode 1 is formed in a spherical shape having a diameter of, for example, 0.5 mm.

Figure 4A:
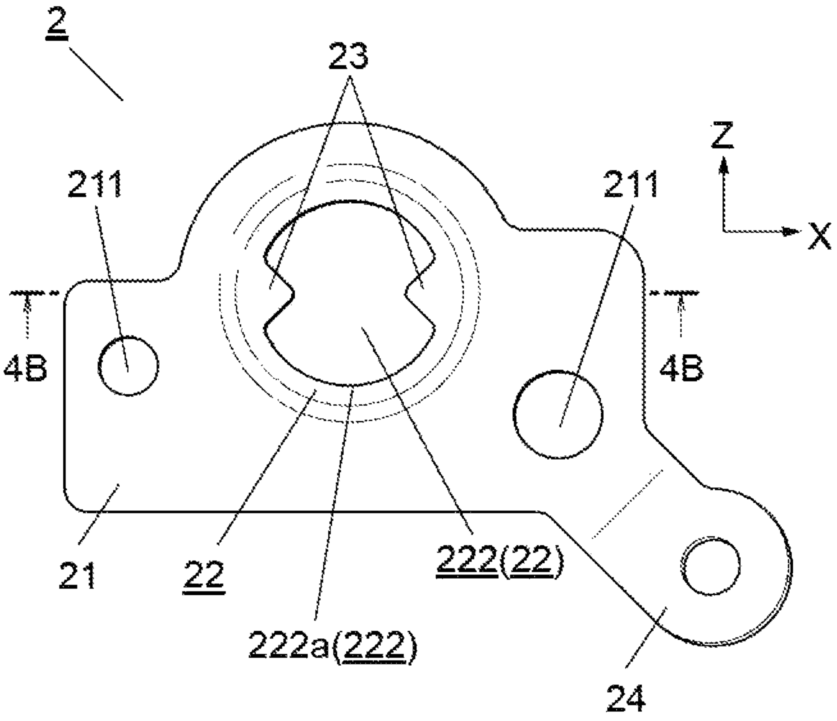
FIG. 4A is a plan view of a counter electrode used in the discharge device.
Figure 4B:
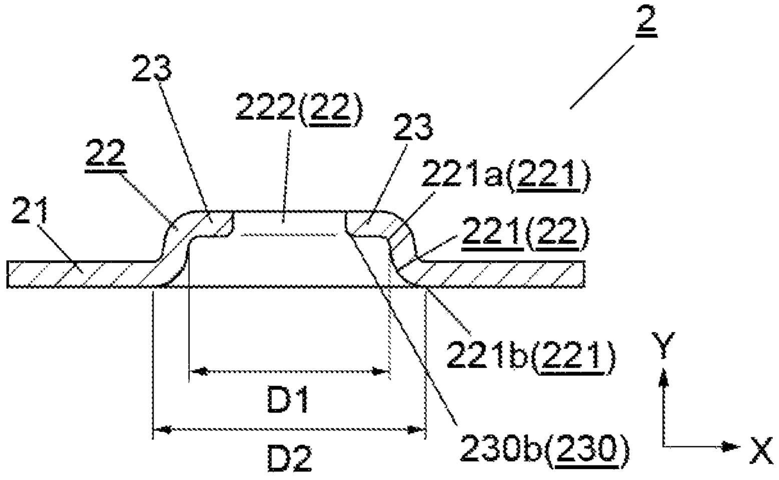
FIG. 4B is a sectional view taken along line 4B-4B in FIG. 4A.

Counter electrode 2 is disposed at a position facing tip 11 of discharge electrode 1 in the first direction (front-rear direction: Y-axis direction). Counter electrode 2 is made of, for example, titanium. As shown in FIGS. 4A and 4B, counter electrode 2 includes a plate-shaped electrode body 21 that extends in the lateral direction (X-axis direction). In counter electrode 2, dome-shaped electrode 22 projecting forward (in the Y-axis direction) is integrally formed in the center of electrode body 21. That is, dome-shaped electrode 22 is formed in a flat hemispherical shell shape in the front-rear direction by recessing a part of electrode body 21 toward the front (Y-axis direction) by, for example, a drawing die.

Further, as shown in FIG. 4B, dome-shaped electrode 22 has inner surface 221 that is recessed forward (in the Y-axis direction). In other words, dome-shaped electrode 22 has recessed inner surface 221 recessed to a side opposite to discharge electrode 1, which faces dome-shaped electrode 22, in the first direction. As shown in FIG. 4B, inner surface 221 has inner diameter D1 at first edge 221*a* (front edge) in the first direction (front-rear direction) smaller than inner diameter D2 at second edge 221*b* (rear edge).

Discharge electrode 1 and counter electrode 2 are disposed such that, as shown in FIG. 1, central axis A1 of discharge electrode 1 and central axis A2 of dome-shaped electrode 22 of counter electrode 2 coincide with each other in a state where discharge electrode 1 and counter electrode 2 are held in housing 5. Thus, discharge electrode 1 and counter electrode 2 are disposed such that tip 11 of discharge electrode 1 and inner surface 221 of dome-shaped electrode 22 of counter electrode 2 face each other in the first direction (front-rear direction). Therefore, when the application voltage is applied between discharge electrode 1 and counter electrode 2, uniformity of the electric field at tip 11 of discharge electrode 1 can be improved. As a result, when the application voltage is applied from voltage application unit 3, it is possible to reduce a variation in the shape of the Taylor cone formed on tip 11 of discharge electrode 1.

Opening 222 is formed at the front end of dome-shaped electrode 22 of counter electrode 2, that is, at the end opposite to discharge electrode 1 that faces counter electrode 2. In the present exemplary embodiment, opening 222 is formed in a circular shape when viewed in the front-rear direction (first direction) as shown in FIG. 4A.

Further, a plurality of (for example, two) protruding electrodes 23 protruding from opening edge 222*a* (inner peripheral edge) is integrally formed in opening 222. Specifically, each of the plurality of protruding electrodes 23 is formed so as to protrude in the lateral direction (second direction) from opening edge 222*a* of opening 222. That is, each of the plurality of protruding electrodes 23 is formed so as to protrude from opening edge 222*a* of opening 222 toward the center of opening 222.

The plurality of protruding electrodes 23 is arranged, for example, at equal intervals along the circumferential direction of opening 222. The plurality of protruding electrodes 23 of the present exemplary embodiment is a pair of protruding electrodes 23, and the pair of protruding electrodes 23 is provided at positions distant from each other by 180 degrees in the circumferential direction of opening 222. In other words, the pair of protruding electrodes 23 is provided at positions symmetrical about the center of opening 222 as the point of symmetry (center of symmetry). Opening 222 and the pair of protruding electrodes 23 are formed (molded) by, for example, a punching die. The specific shape of protruding electrode 23 will be described in the section of "(2.3) Shape of protruding electrode".

Dome-shaped electrode 22 formed on electrode body 21 of counter electrode 2 has a pair of caulking holes 211 penetrating in the front-rear direction (Y-axis direction) on both the left and right sides. Counter electrode 2 of the present exemplary embodiment is subjected to heat caulking after a pair of caulking projections 51 formed on housing 5 shown in FIG. 2B is inserted into a pair of caulking holes 211. Thus, counter electrode 2 is caulked and fixed to housing 5. Further, as shown in FIG. 4A, electrode body 21 has grounding terminal piece 24 integrally formed at the lower right corner.

As shown in FIG. 3, liquid supply unit 4 supplies liquid 40 for electrostatic atomization to discharge electrode 1. As an example, liquid supply unit 4 is achieved using cooling device 41 that cools discharge electrode 1 to generate condensation water on discharge electrode 1. Specifically, as shown in FIG. 1, cooling device 41 includes, for example, a plurality of (four in the example of FIG. 1) Peltier elements 411, radiator plate 412, insulating plate 413, and the like. The plurality of Peltier elements 411 is held by radiator plate 412. Each of the plurality of Peltier elements 411 is arranged such that the upper side is a heat-absorbing side and the lower side is a heat-dissipation side. That is, the plurality of Peltier elements 411 is held by radiator plate 412 on the heat-dissipation side. Cooling device 41 cools discharge electrode 1 by applying a current to the plurality of Peltier elements 411.

Further, the plurality of Peltier elements 411 is mechanically connected to discharge electrode 1 via insulating plate 413. That is, discharge electrode 1 is mechanically connected to insulating plate 413 via base end 12. On the other hand, the plurality of Peltier elements 411 is mechanically connected to insulating plate 413 on the heat-absorbing side (upper side). Thus, discharge electrode 1 and the plurality of Peltier elements 411 are electrically insulated by insulating plate 413 and the like.

Cooling device 41 in the present exemplary embodiment cools discharge electrode 1 mechanically connected to Peltier elements 411 on the heat-absorbing side by applying a current to the plurality of Peltier elements 411. At this time, cooling device 41 cools entire discharge electrode 1 through base end 12 of discharge electrode 1. Accordingly, the moisture in the air condenses and adheres to the surface of discharge electrode 1 as condensation water. That is, liquid supply unit 4 is configured to cool discharge electrode 1 and generate condensation water as liquid 40 on the surface of discharge electrode 1. According to this configuration, liquid supply unit 4 supplies liquid 40 (condensation water) to discharge electrode 1 using the moisture in the air. This eliminates the need to provide another device for supplying and replenishing the liquid to discharge device 10.

As shown in FIG. 3, voltage application unit 3 includes, for example, an isolated AC/DC converter. Voltage application unit 3 converts AC power supplied from AC power supply AC via power cord 103 into DC power. Voltage application unit 3 then applies the converted DC power between discharge electrode 1 and counter electrode 2.

Specifically, voltage application unit 3 includes diode bridge 31, isolation transformer 32, capacitor 33, resistors 34 and 35, a pair of input terminals 361 and 362, a pair of output terminals 371 and 372, and the like.

Diode bridge 31 is, for example, an element in which four diodes are connected in bridge. A pair of input ends of diode bridge 31 is electrically connected to the pair of input terminals 361 and 362. A pair of output ends of diode bridge 31 is electrically connected between both ends of primary winding 321 of isolation transformer 32. Diode bridge 31 rectifies (for example, provides full-wave rectification of) the AC power from AC power supply AC input via the pair of input terminals 361 and 362.

Isolation transformer 32 includes primary winding 321 and secondary winding 322. Primary winding 321 is electrically insulated from and magnetically coupled to secondary winding 322. One end of secondary winding 322 is electrically connected to, for example, output terminal 371 of the pair of output terminals 371 and 372, and the other end of secondary winding 322 is electrically connected to other output terminal 372 via resistor 35. Further, smoothing capacitor 33 and resistor 34 are electrically connected in parallel between both ends of secondary winding 322.

AC power supply AC is electrically connected between the pair of input terminals 361 and 362 of voltage application unit 3. Counter electrode 2 is electrically connected to, for example, output terminal 371 of the pair of output terminals 371 and 372, and discharge electrode 1 is electrically connected to other output terminal 372.

Voltage application unit 3 applies a high voltage to discharge electrode 1 and counter electrode 2. Here, the "high voltage" indicates a voltage high enough to cause the abovementioned partial breakdown discharge between discharge electrode 1 and counter electrode 2. Specifically, voltage application unit 3 applies a DC voltage of, for example, about −4 kV to discharge electrode 1 with counter electrode 2 grounded via terminal piece 24. In other words, in a state where a high voltage is applied from voltage application unit 3 to discharge electrode 1 and counter electrode 2, a potential difference with a side of counter electrode 2 being high and a side of discharge electrode 1 being low is generated between discharge electrode 1 and counter electrode 2.

Note that the value of the high voltage applied from voltage application unit 3 to discharge electrode 1 and counter electrode 2 is set, as appropriate, depending on, for example, the shapes of discharge electrode 1 and counter electrode 2, the distance between discharge electrode 1 and counter electrode 2, etc.

According to voltage application unit 3 described above, when the application voltage applied between output terminals 371 and 372 reaches a predetermined voltage (a voltage at which a discharge starts), a discharge occurs between discharge electrode 1 and counter electrode 2. Along with the discharge, a relatively large discharge current flows through voltage application unit 3. At this time, the discharge current flows through resistors 34 and 35 of voltage application unit 3. Thus, the application voltage applied between output terminals 371 and 372 becomes smaller than the predetermined voltage, so that the discharge current is interrupted. After that, the application voltage increases due to the interruption of the discharge current, and reaches the predetermined voltage again. When the application voltage reaches the predetermined voltage, a discharge is generated between discharge electrode 1 and counter electrode 2 again, and a discharge current flows. Then, after that, the abovementioned operation is repeated. Accordingly, a discharge occurs intermittently.

(2.3) Shape of Protruding Electrode

Discharge device 10 according to the present exemplary embodiment aims to increase the produced amount of acidic components. To this end, discharge device 10 is configured such that a partial breakdown discharge occurs between discharge electrode 1 and protruding electrode 23 of counter electrode 2.

Figure 5:
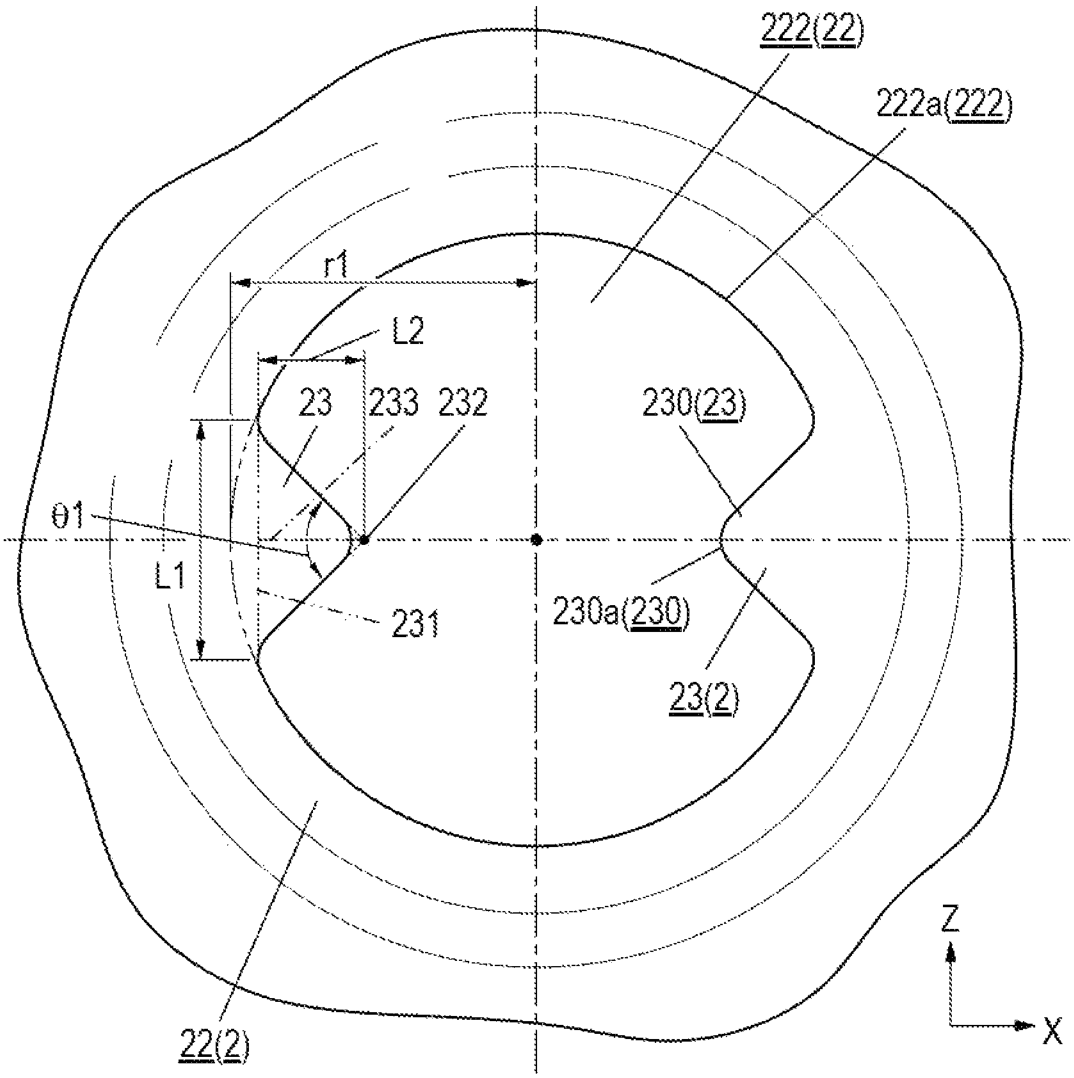
FIG. 5 is a plan view showing a main part of the counter electrode used in the discharge device.

Further, in order to reduce the generated amount of ozone, discharge device 10 needs to have a configuration for concentrating an electric field on the tip of protruding electrode 23. In this case, protruding electrode 23 preferably has a triangular shape as shown in FIG. 5. In other words, the shape of protruding electrode 23 when viewed in the first direction (front-rear direction) is preferably a triangle. The term "triangle" or "triangular shape" described in the present disclosure is not limited to a so-called common triangle having three vertices. For example, a shape in which the tip is rounded as in protruding electrode 23 shown in FIG. 5 is also included.

Further, it is preferable that, in order to concentrate the electric field on tip 230 of protruding electrode 23 formed in a triangular shape, the angle (vertex angle θ1) of tip 230 of protruding electrode 23 is an acute angle. Meanwhile, protruding electrode 23 is formed (molded) by a punching die as described above. During formation, if the angle of tip 230 of protruding electrode 23 is too small, there is a high possibility that the punching die will be damaged. In view of this, it is preferable that, in order to concentrate the electric field on tip 230 of protruding electrode 23 while preventing damage of the punching die, the angle of tip 230 of protruding electrode 23 is, for example, 60 degrees or more. That is, as shown in FIG. 5, vertex angle θ1 of the triangle is preferably 60 degrees or more. Further, vertex angle θ1 of the triangle is more preferably 90 degrees.

Note that the shape of the triangle is preferably an isosceles triangle including an equilateral triangle. In this case, if the length of base 231 of the triangle is L1, and the length of perpendicular line 233 from vertex 232 facing base 231 to base 231 is L2, Equation (1) is established.

[Equation 1]

$$L1 \geq \frac{2}{\sqrt{3}} L2 \tag{1}$$

From Equation (1), when vertex angle θ1 of the triangle is 60 degrees or more, length L1 of base 231 is longer than length L2 of perpendicular line 233. That is, base 231 of the triangle is longer than perpendicular line 233 from vertex 232 facing base 231 to base 231. In this case, it is further preferable that length L2 of perpendicular line 233 of the triangle is less than or equal to a half of radius r1 of opening 222, as shown in FIG. 5. When protruding electrode 23 is formed to have the abovementioned triangular shape, the electric field can be concentrated on tip 230 of protruding electrode 23 while preventing damage to the punching die. As a result, a partial breakdown discharge between discharge electrode 1 and protruding electrode 23 can be stably generated.

Note that, in the present exemplary embodiment, length L1 of base 231 of the triangle of protruding electrode 23 is, for example, 1 mm or less.

On the other hand, when tip 230 of protruding electrode 23 is sharp, the electric field is likely to concentrate on tip 230. Therefore, electrolytic corrosion is likely to occur at tip 230 of protruding electrode 23 due to the electric field. As a result, the discharge state in the partial breakdown discharge between discharge electrode 1 and protruding electrode 23 may change over time due to shape variation by electrolytic corrosion. Therefore, it is more preferable that tip 230 of protruding electrode 23 has a curved surface such that the discharge state does not change over time.

In view of this, as shown in FIGS. 4B and 5, each of the pair of protruding electrodes 23 of the present exemplary embodiment includes first curved surface 230*a* formed on a tip surface (left end surface or right end surface) of tip 230 and second curved surface 230*b* formed on the lower surface of tip 230 facing discharge electrode 1. That is, the surface facing discharge electrode 1 at tip 230 of each of protruding electrodes 23 has a curved surface. In the present exemplary embodiment, first curved surface 230*a* and second curved surface 230*b* are formed to have a radius of curvature of, for example, about 0.1 mm.

With this configuration, the electric field is concentrated on the curved surfaces (first curved surface 230*a* and second curved surface 230*b*) formed on tips 230 of protruding electrodes 23. Therefore, the occurrence of electrolytic corrosion can be suppressed as compared with the configuration where tips 230 of protruding electrodes 23 are sharp. As a result, the occurrence of a change over time in the discharge state due to the shape variation of tips 230 of protruding electrodes 23 is suppressed. Consequently, the discharge state of discharge device 10 can be stably maintained for a long period of time.

(2.4) Partial Breakdown Discharge

Figure 6B:
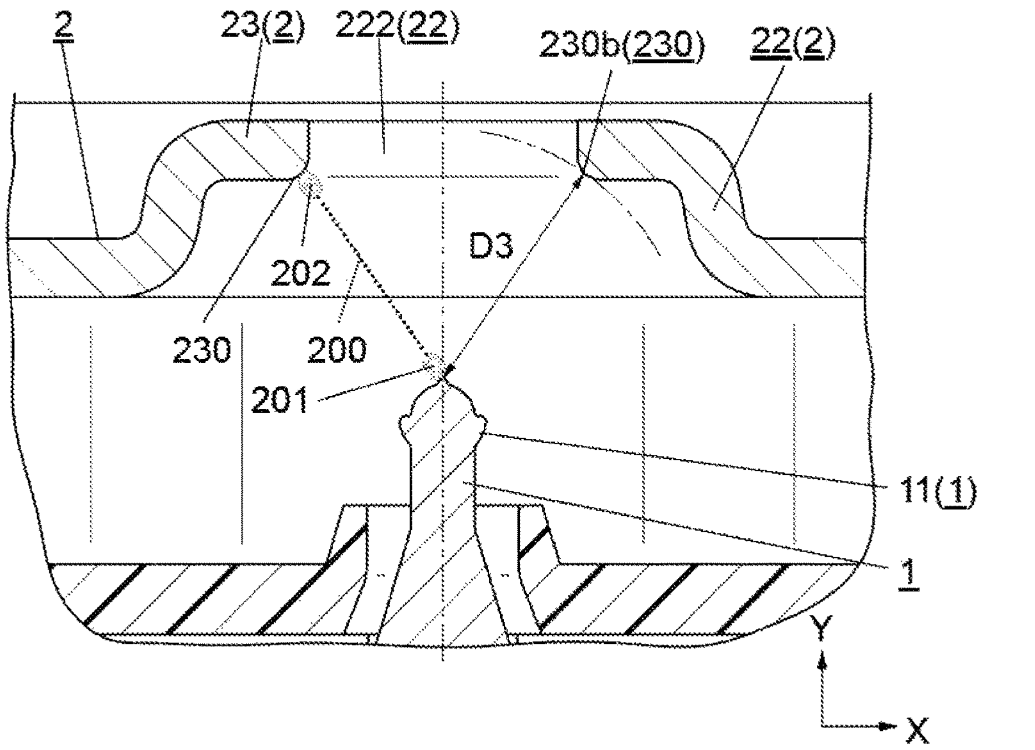
FIG. 6B is a conceptual diagram for describing a partial breakdown discharge generated in the discharge device.

Hereinafter, the partial breakdown discharge generated when the application voltage is applied between discharge electrode 1 and counter electrode 2 will be described with reference to FIGS. 6A and 6B.

FIG. 6A is a conceptual diagram for describing the partial breakdown discharge when liquid 40 is retained on discharge electrode 1. FIG. 6B is a conceptual diagram for describing the partial breakdown discharge when liquid 40 is not retained on discharge electrode 1. Note that, in the description with reference to FIG. 6A and the description with reference to FIG. 6B, "liquid 40 retained on discharge electrode 1" may be replaced by "tip 11 of discharge electrode 1". Therefore, in the following, only FIG. 6A will be described, and the description of FIG. 6B will be omitted.

Discharge device 10 according to the present exemplary embodiment first causes a local corona discharge in liquid 40 retained on discharge electrode 1. Since discharge electrode 1 of the present exemplary embodiment is on the negative electrode side, the corona discharge generated in liquid 40 retained on discharge electrode 1 is a negative corona discharge.

Then, discharge device 10 develops the corona discharge generated in liquid 40 retained on discharge electrode 1 to a higher energy discharge. Due to the discharge with higher energy, discharge path 200 in which the partial dielectric breakdown occurs is formed between discharge electrode 1 and counter electrode 2.

At this time, the partial breakdown discharge is accompanied by partial dielectric breakdown between discharge electrode 1 and counter electrode 2, but dielectric breakdown is not continuously generated. That is, the partial breakdown discharge is a discharge in which the dielectric breakdown occurs intermittently. Therefore, the flow of the discharge current generated between discharge electrode 1 and counter electrode 2 also occurs intermittently. That is, in a case where the power supply (voltage application unit 3) does not have a current capacity required to maintain discharge path 200, the voltage applied between discharge electrode 1 and counter electrode 2 reduces as soon as the corona discharge develops to the partial breakdown discharge. As a result, discharge path 200 formed between discharge electrode 1 and counter electrode 2 is interrupted, and the discharge is stopped. Note that the "current capacity" indicates a capacity of current that can be released in a unit time.

Then, the discharge current flows intermittently between discharge electrode 1 and counter electrode 2 due to the repetition of generation and stop of the discharge as described above. As described above, in the partial breakdown discharge, a state having high discharge energy and a state having low discharge energy are repeated, and in that point, the partial breakdown discharge is different from a glow discharge and an arc discharge in which dielectric breakdown occurs continuously (that is, a discharge current is continuously generated).

More specifically, voltage application unit 3 first applies an application voltage between discharge electrode 1 and counter electrodes 2 which face each other with a gap therebetween. Accordingly, a discharge is generated between liquid 40 retained on discharge electrode 1 and counter electrode 2. At this time, when the discharge occurs, discharge path 200 in which dielectric breakdown partially occurs is formed between discharge electrode 1 and counter electrode 2.

That is, discharge path 200 in which dielectric breakdown occurs not entirely but partially (locally) is formed between discharge electrode 1 and counter electrode 2. Thus, in the partial breakdown discharge, discharge path 200 formed between discharge electrode 1 and counter electrode 2 does not reach entire dielectric breakdown, but has partial dielectric breakdown.

Here, discharge path 200 includes first dielectric breakdown region 201 generated around discharge electrode 1 and second dielectric breakdown region 202 generated around counter electrode 2 as described above. First dielectric breakdown region 201 is a region where dielectric breakdown occurs around discharge electrode 1. Second dielectric breakdown region 202 is a region where dielectric breakdown occurs around counter electrode 2.

At this time, discharge electrode 1 retains liquid 40 as shown in FIG. 6A. Therefore, when the application voltage is applied between liquid 40 and counter electrode 2, first dielectric breakdown region 201 is generated particularly near the tip of liquid 40 in a region around discharge electrode 1.

First dielectric breakdown region 201 and second dielectric breakdown region 202 are generated apart from each other in discharge path 200 so as not to come into contact with each other. Therefore, discharge path 200 includes a region (insulation region) where dielectric breakdown does not occur at least between first dielectric breakdown region 201 and second dielectric breakdown region 202. Accordingly, in the partial breakdown discharge, the space between liquid 40 retained on discharge electrode 1 and counter electrode 2 does not reach entire dielectric breakdown, but has only partial dielectric breakdown, and the discharge current flows through the space via discharge path 200. That is, when discharge path 200 in which partial dielectric breakdown occurs, in other words, discharge path 200 partially including a region where dielectric breakdown does not occur, is used, a discharge current flows between discharge electrode 1 and counter electrode 2 through discharge path 200, and a discharge occurs.

In this case, second dielectric breakdown region 202 is basically generated around the portion of counter electrode 2 where the distance (spatial distance) to discharge electrode 1 is the shortest. In discharge device 10 according to the present exemplary embodiment, angle θ2 between central axis P1 of discharge electrode 1 and the protrusion direction (X-axis direction) of protruding electrode 23 is 90 degrees as shown in FIG. 6A. Therefore, distance D3 (see FIG. 6A) between second curved surface 230*b* of tip 230 of protruding electrode 23 of counter electrode 2 and tip 40*a* (vertex) of the Taylor cone of liquid 40 formed on discharge electrode 1 is the shortest. That is, second dielectric breakdown region 202 is generated in the vicinity of the periphery of second curved surface 230*b* of tip 230 of protruding electrode 23.

Here, counter electrode 2 of the present exemplary embodiment has a plurality of (for example, two) protruding electrodes 23 as described above. Protruding electrodes 23 are disposed such that distance D3 from each protruding electrode 23 to discharge electrode 1 is the same. Therefore, second dielectric breakdown region 202 is generated in the vicinity of the periphery of second curved surface 230*b* of tip 230 of any one of protruding electrodes 23 among the plurality of protruding electrodes 23. That is, protruding electrode 23 on which second dielectric breakdown region 202 is generated is not limited to specific protruding electrode 23, and is randomly determined among the plurality of protruding electrodes 23 due to various factors in the event of a discharge.

In other words, in the partial breakdown discharge, first dielectric breakdown region 201 is generated in the vicinity of the periphery of discharge electrode 1 so as to extend from discharge electrode 1 toward counter electrode 2 which is a counterpart as shown in FIG. 6A. On the other hand, second dielectric breakdown region 202 is generated in the vicinity of the periphery of counter electrode 2 so as to extend from counter electrode 2 toward discharge electrode 1 which is a counterpart. With this configuration, first dielectric breakdown region 201 and second dielectric breakdown region 202 are generated so as to respectively extend from discharge electrode 1 and counter electrode 2 in a direction in which they attract each other. Therefore, each of first dielectric breakdown region 201 and second dielectric breakdown region 202 is generated in the direction along discharge path 200 with a predetermined length according to the strength of the electric field generated by the application voltage.

As described above, in the partial breakdown discharge, the region where dielectric breakdown partially occurs (first dielectric breakdown region 201 and second dielectric breakdown region 202) is generated to have a shape extending in a specific direction along discharge path 200.

Further, in the abovementioned partial breakdown discharge, a large amount of energy is generated as compared with the corona discharge. Due to the large amount of energy, oxygen and nitrogen in the air chemically react with each other, for example, to generate an acidic component such as nitrogen oxide. When attached to, for example, skin, the generated acidic component makes the skin mildly acidic. Therefore, the acidic component accelerates, in the skin, the production of moisturizing ingredients such as natural moisturizing molecules and intercellular lipids. In other words, the acidic component has an effect of boosting the ability of the skin to retain moisture. In addition, the acidic component tightens cuticle that covers the surface of the hair. That is, the acidic component also has an effect of preventing discharge of water, nutrients, and the like from inside of the hair.

In addition, when acidic components are generated by the partial breakdown discharge, ozone is also generated simultaneously. Meanwhile, discharge device 10 according to the present exemplary embodiment is configured such that an electric field is concentrated on tip 230 of protruding electrode 23. Accordingly, the generated amount of ozone can be suppressed to the same extent as that in a corona discharge.

Further, in the partial breakdown discharge, large amounts of radicals about 2 to 10 times as much as that in the corona discharge are generated. The generated radicals are the basis for providing useful effects in various situations, besides sterilization, deodorization, moisture retention, freshness retention, and inactivation of viruses. Therefore, the generated radicals can also be effectively utilized.

(3) Product

Hereinafter, a product produced by discharge device 10 according to the present exemplary embodiment will be described with reference to FIGS. 7A, 7B, and 8.

Figure 7A:
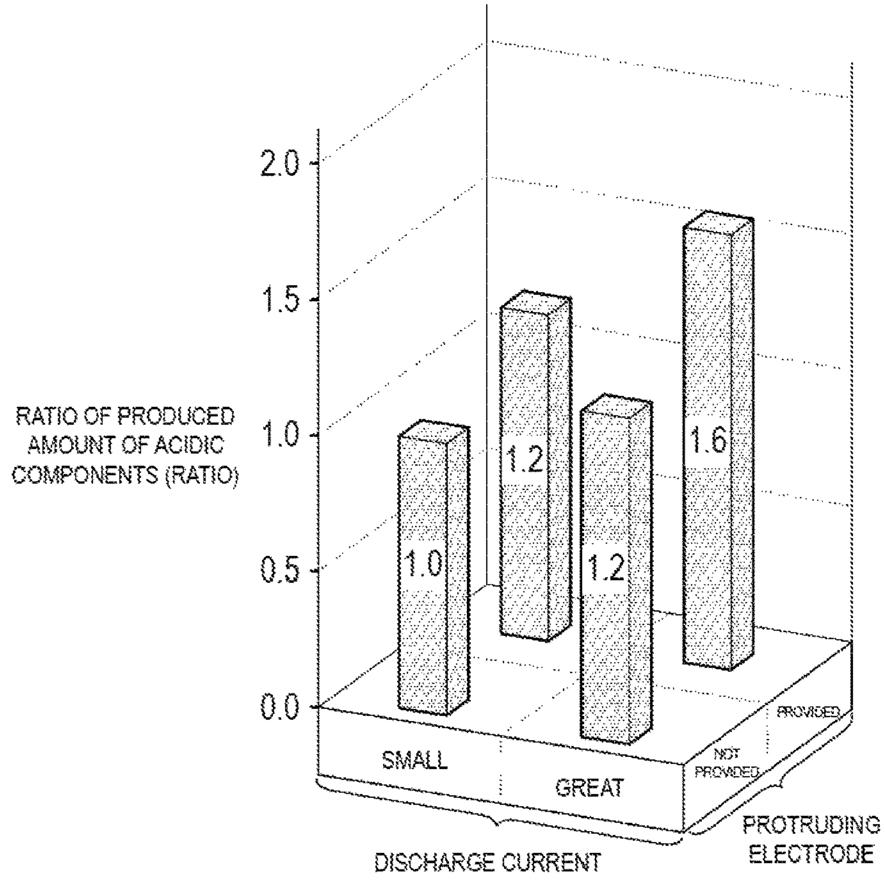
FIG. 7A is a graph showing a relationship among magnitude of a discharge current flowing between the discharge electrode and the counter electrode, presence or absence of a protruding electrode, and a ratio of a produced amount of acidic components.

FIG. 7A is a graph showing a relationship among the magnitude of the discharge current flowing between discharge electrode 1 and counter electrode 2, presence or absence of protruding electrode 23, and a ratio of a produced amount of acidic components. FIG. 7B is a graph showing a relationship among the magnitude of the discharge current flowing between discharge electrode 1 and counter electrode 2, presence or absence of protruding electrode 23, and a ratio of a generated amount of ozone. FIG. 8 is a graph showing a relationship between presence or absence of protruding electrode 23 and a ratio of a produced amount of charged fine particle water.

(3.1) Produced Amount of Acidic Components

First, the produced amount of acidic components by the discharge generated between discharge electrode 1 and counter electrode 2 will be described with reference to FIG. 7A.

In FIG. 7A, a corona discharge in which a discharge current is smaller than that in a partial breakdown discharge is indicated as a comparison target for the produced amount of acidic components.

That is, in FIG. 7A, the case in which the discharge current is small corresponds to a corona discharge, and the case in which the discharge current is large corresponds to a partial breakdown discharge. Further, in FIG. 7A, the produced amount of acidic components in a case where the corona discharge occurs without providing protruding electrode 23 to counter electrode 2 is set as a reference value (1.0), and produced amounts of acidic components are expressed in a ratio to the reference value.

It can be seen from FIG. 7A that, in the case where the corona discharge occurs and counter electrode 2 is provided with protruding electrode 23, discharge device 10 produces an acidic component in an amount 1.2 times the reference value. Similarly, it can be seen that, in the case where the partial breakdown discharge occurs and counter electrode 2 is not provided with protruding electrode 23, discharge device 10 produces an acidic component in an amount 1.2 times the reference value. On the other hand, it can be seen that, in the case where the partial breakdown discharge occurs and counter electrode 2 is provided with protruding electrode 23, discharge device 10 produces an acidic component in an amount 1.6 times the reference value.

That is, due to the configuration in which the partial breakdown discharge is generated between discharge electrode 1 and counter electrode 2, and protruding electrode 23 is provided on counter electrode 2, discharge device 10 according to the present exemplary embodiment can significantly increase the produced amount of acidic components.

(3.2) Generated Amount of Ozone

Next, the generated amount of ozone generated by the discharge caused between discharge electrode 1 and counter electrode 2 will be described with reference to FIG. 7B.

Figure 7B:
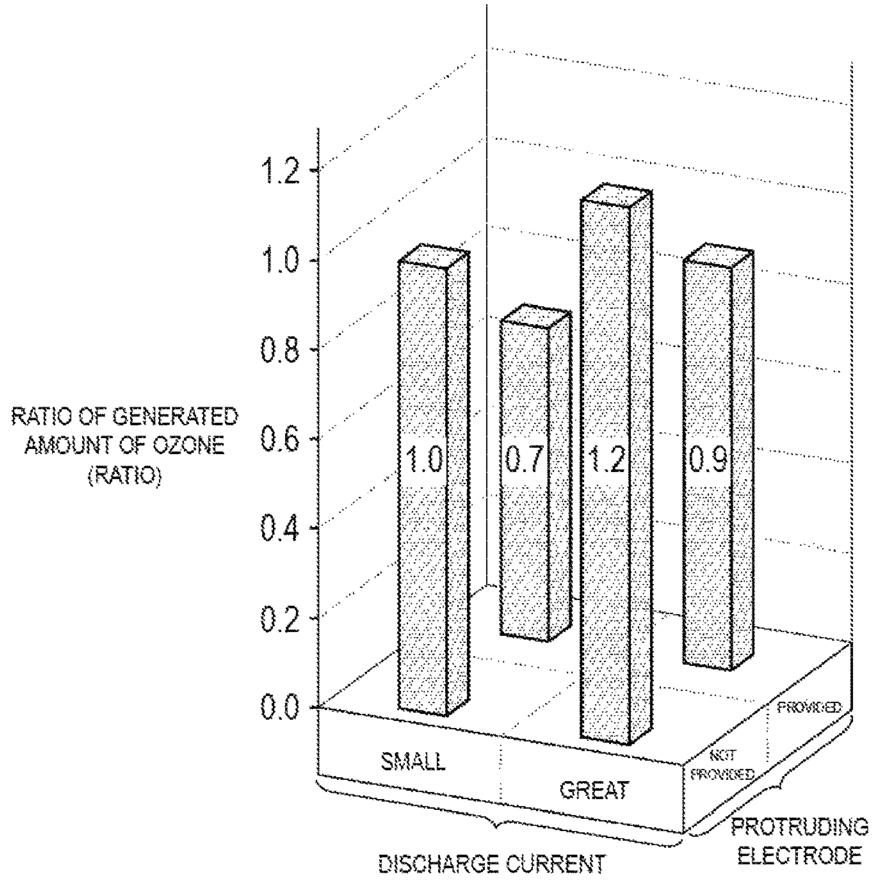
FIG. 7B is a graph showing a relationship among magnitude of a discharge current flowing between the discharge electrode and the counter electrode, presence or absence of a protruding electrode, and a ratio of a generated amount of ozone.

Similar to FIG. 7A, in FIG. 7B, a corona discharge in which a discharge current is smaller than that in partial breakdown discharge is indicated as a comparison target for the generated amount of ozone.

That is, in FIG. 7B, the case in which the discharge current is small corresponds to a corona discharge, and the case in which the discharge current is large corresponds to a partial breakdown discharge. Further, in FIG. 7B, the generated amount of ozone in a case where the corona discharge occurs without providing protruding electrode 23 to counter electrode 2 is set as a reference value (1.0), and generated amounts of ozone are expressed in a ratio to the reference value.

It can be seen from FIG. 7B that, in the case where the corona discharge occurs and counter electrode 2 is provided with protruding electrode 23, discharge device 10 generates ozone in an amount 0.7 times the reference value. On the other hand, it can be seen that, in the case where the partial breakdown discharge occurs and counter electrode 2 is not provided with protruding electrode 23, discharge device 10 generates ozone in an amount 1.2 times the reference value. Further, it can be seen that, in the case where the partial breakdown discharge occurs and counter electrode 2 is provided with protruding electrode 23, discharge device 10 generates ozone in an amount 0.9 times the reference value.

That is, it can be found that, in discharge device 10 in which protruding electrode 23 is provided on counter electrode 2, the generated amount of ozone decreases in both the corona discharge and the partial breakdown discharge.

Here, the reason why the generated amount of ozone decreases is presumed as follows. First, the reaction between ozone and nitrogen or nitrogen oxides proceeds due to the discharge between discharge electrode 1 and counter electrode 2 (protruding electrode 23). Accordingly, ozone disappears, and it is estimated that the generated amount of ozone will decrease.

Further, as shown in FIG. 7B, in discharge device 10 in which protruding electrode 23 is provided on counter electrode 2, the reduction in an amount of ozone is slightly greater in the corona discharge than in the partial breakdown discharge. However, the produced amount of acidic components is larger in the partial breakdown discharge than in the corona discharge as shown in FIG. 7A.

It can be found from the above results that, considering both amounts, the configuration in which the partial breakdown discharge is caused, and protruding electrode 23 is provided on counter electrode 2 is the most preferable. That is, due to the configuration in which the partial breakdown discharge is generated between discharge electrode 1 and counter electrode 2, and protruding electrode 23 is provided on counter electrode 2, discharge device 10 can reduce the generated amount of ozone, while increasing the produced amount of acidic components.

(3.3) Produced Amount of Charged Fine Particle Water

Next, the produced amount of charged fine particle water by the partial breakdown discharge caused between discharge electrode 1 and counter electrode 2 will be described with reference to FIG. 8.

Figure 8:
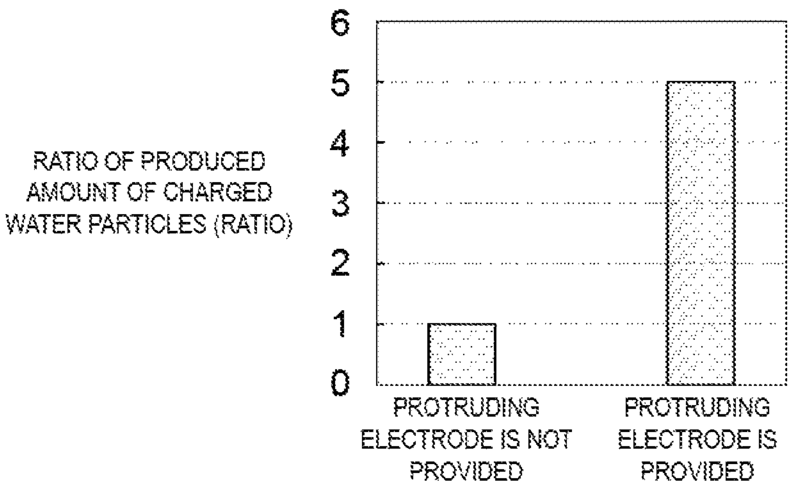
FIG. 8 is a graph showing a relationship between presence or absence of a protruding electrode and a ratio of a produced amount of charged fine particle water.

In FIG. 8, the produced amount of charged fine particle water in discharge device 10 in the case where counter electrode 2 is not provided with protruding electrode 23 is set as a reference value (1.0), and a produced amount of charged fine particle water is expressed in a ratio to the reference value.

It can be seen from FIG. 8 that, when protruding electrode 23 is provided on counter electrode 2 and the partial breakdown discharge is generated between liquid 40 retained on discharge electrode 1 and protruding electrode 23, charged fine particle water in an amount 5 times the reference value is produced. That is, it can be found that, due to the formation of protruding electrode 23 on counter electrode 2, the produced amount of charged fine particle water can be significantly increased as compared with the configuration having no protruding electrode 23.

(4) Modifications

The exemplary embodiment is only one of various exemplary embodiments of the present disclosure. The exemplary embodiment described above can be variously modified according to the design and the like as long as the object of the present disclosure can be achieved. Modifications of the abovementioned exemplary embodiment will be described below. Further, the modifications described below can be applied in combination as appropriate.

(4.1) First Modification

Figure 9:
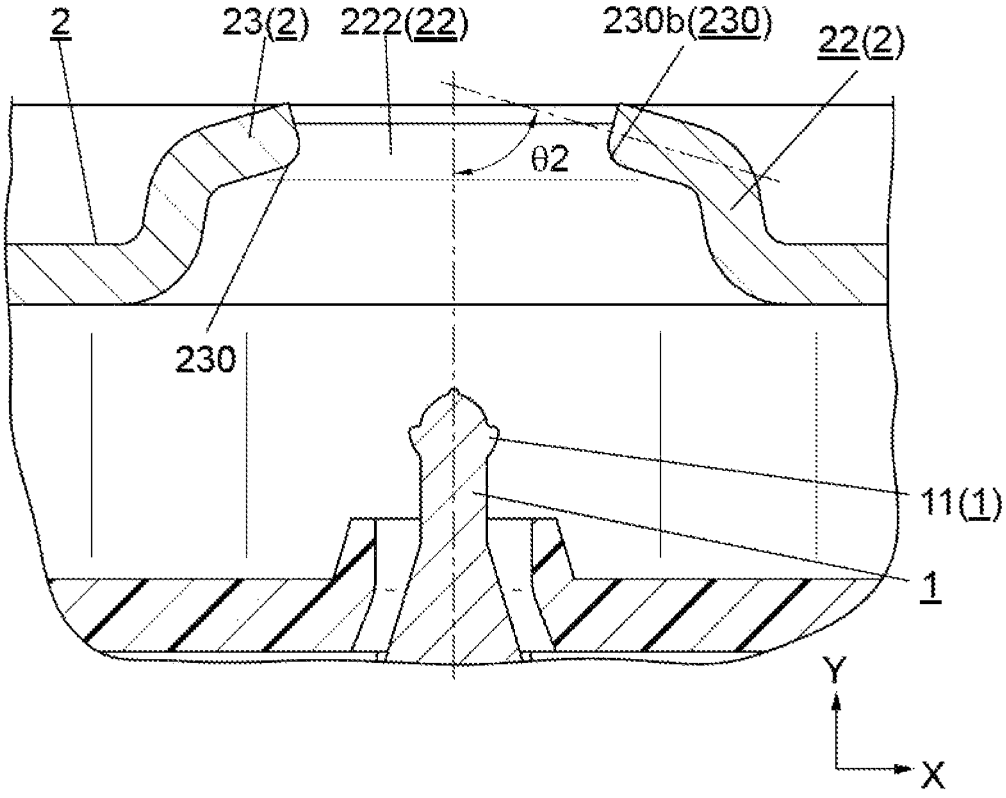
FIG. 9 is a sectional view showing a main part of a discharge device according to a first modification of the exemplary embodiment.

In the abovementioned exemplary embodiment, angle θ2 between central axis P1 of discharge electrode 1 and the protrusion direction of protruding electrode 23 is 90 degrees as shown in FIG. 6A as one example. However, the present disclosure is not limited thereto. For example, angle θ2 between central axis P1 of discharge electrode 1 and the direction in which protruding electrode 23 protrudes may be an acute angle as shown in FIG. 9. That is, protruding electrode 23 of counter electrode 2 may be inclined in the first direction (front-rear direction: Y-axis direction), that is, in a direction away from discharge electrode 1, with nearness to the center of opening 222. In this case, it is necessary to set the shape, dimensions, and the like of inclined protruding electrode 23 such that the distance between discharge electrode 1 and tip 230 of protruding electrode 23 is the shortest. With this configuration, the direction of force acting on discharge electrode 1 and liquid 40 can be controlled by adjusting inclination angle θ2 of protruding electrode 23. Further, the location where the electric field is concentrated in protruding electrode 23 can be adjusted. That is, when angle θ2 is changed, the distance between protruding electrode 23 and discharge electrode 1 changes, so that the state of occurrence of discharge changes. Therefore, the direction of force acting on discharge electrode 1 and liquid 40 can be controlled.

(4.2) Second to Fifth Modifications

Figure 10A:
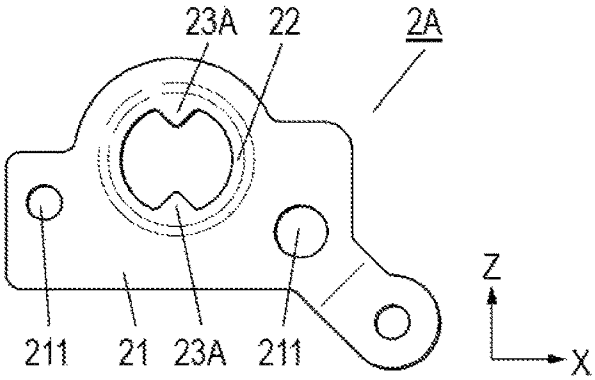
FIG. 10A is a plan view of a counter electrode used in a discharge device according to a second modification of the exemplary embodiment.

In the abovementioned exemplary embodiment, a plurality of protruding electrodes 23 is arranged so as to face each other in the lateral direction (X-axis direction) as shown in FIG. 4A as one example. However, the present disclosure is not limited thereto. For example, as in the second modification shown in FIG. 10A, a plurality of protruding electrodes 23A of counter electrode 2A may be arranged so as to face each other in the vertical direction (Z-axis direction).

Further, in the abovementioned exemplary embodiment and the second modification, a number of protruding electrodes 23 and 23A is two as an example, but the present disclosure is not limited thereto. For example, as in the third modification shown in FIG. 10B or the fourth modification shown in FIG. 10C, a number of protruding electrodes 23B and 23C may be four. With the configurations of the modifications, the life of the protruding electrode can be extended.

Figure 10B:
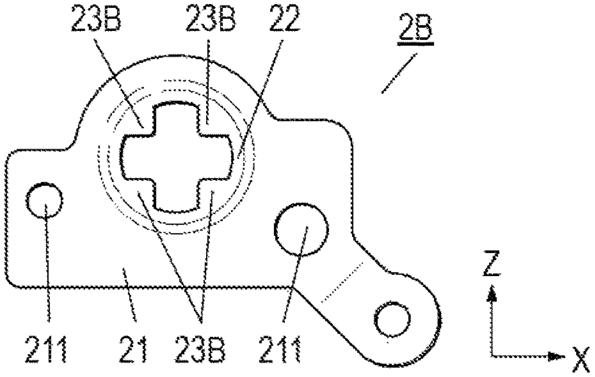
FIG. 10B is a plan view of a counter electrode used in a discharge device according to a third modification of the exemplary embodiment.
Figure 10C:
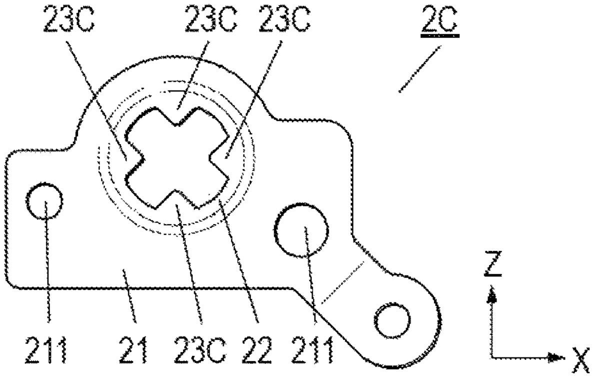
FIG. 10C is a plan view of a counter electrode used in a discharge device according to a fourth modification of the exemplary embodiment.

In FIGS. 10B and 10C, the rightward direction corresponds to the direction of 0 degrees, and the leftward direction corresponds to the direction of 180 degrees.

That is, in the third modification, four protruding electrodes 23B are positioned at 45 degrees, 135 degrees, 225 degrees, and 315 degrees when counter electrode 2B is viewed from front (Y-axis direction), as shown in FIG. 10B.

Further, in the fourth modification, four protruding electrodes 23C are positioned at 0 degrees, 90 degrees, 180 degrees, and 270 degrees when counter electrode 2C is viewed from front, as shown in FIG. 10C.

Figure 10D:
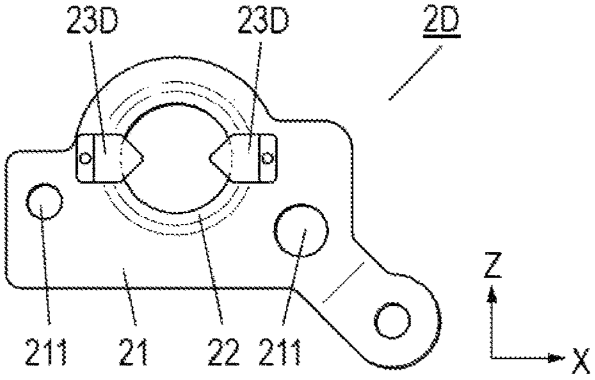
FIG. 10D is a plan view of a counter electrode used in a discharge device according to a fifth modification of the exemplary embodiment.

Further, in the abovementioned exemplary embodiment and the second to fourth modifications, protruding electrodes 23 and 23A to 23C are formed integrally with electrode bodies 21 of counter electrodes 2 and 2A to 2C, but the present disclosure is not limited thereto. For example, as shown in the fifth modification shown in FIG. 10D, protruding electrodes 23D may be provided separately from electrode body 21 of counter electrode 2D. In this case, protruding electrodes 23D are fixed to electrode body 21 by an appropriate fixing method (for example, screw fixation, caulking, etc.).

According to the second to fifth modifications, protruding electrodes 23A to 23D are provided on counter electrodes 2A to 2D, and a partial breakdown discharge is generated between discharge electrode 1 and protruding electrodes 23A to 23D. Thus, similar to discharge device 10 in the above exemplary embodiment, the generated amount of ozone can be reduced while increasing the produced amount of acidic components.

Hair care device 100 equipped with discharge device 10 using counter electrode 2 according to the above exemplary embodiment and hair care device 100A equipped with discharge device 10A using counter electrode 2A according to the second modification will be described below with reference to FIGS. 2B and 11.

FIG. 2B is a perspective view showing that discharge device 10 using counter electrode 2 according to the above exemplary embodiment is incorporated into hair care device 100. FIG. 11 is a perspective view showing that discharge device 10A using counter electrode 2A according to the second modification is incorporated into hair care device 100A.

Figure 11:
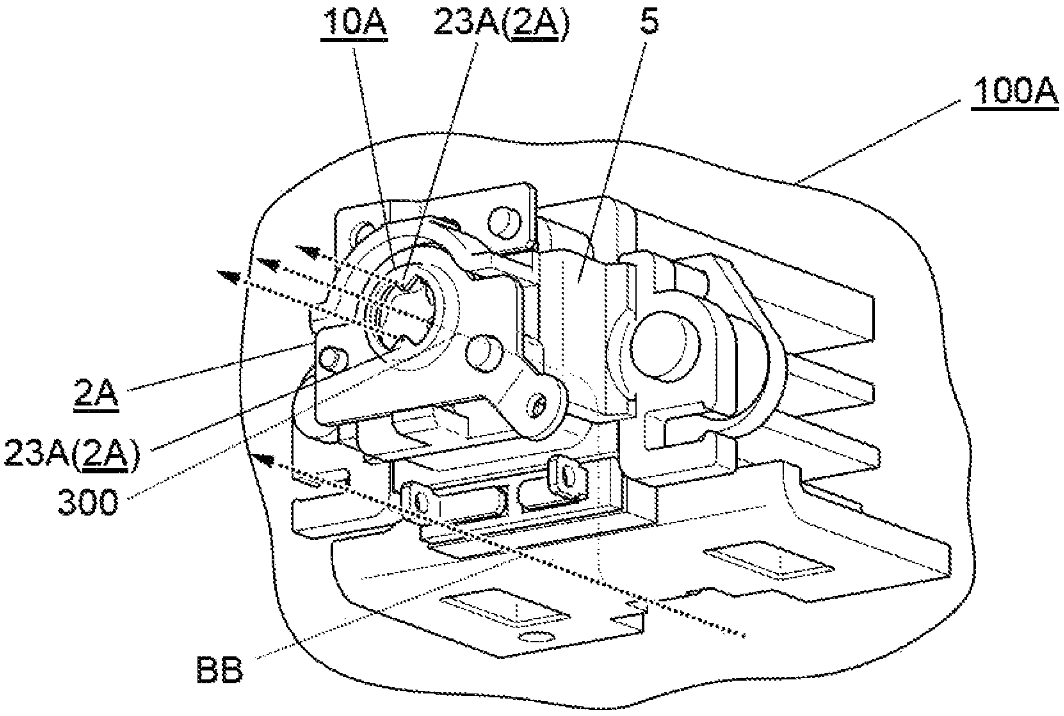
FIG. 11 is a perspective view showing a main part of a hair care device including the discharge device according to the second modification of the exemplary embodiment.

Note that flow path 300 shown in FIGS. 2B and 11 indicates the flow of air from airflow generator 20 to discharge devices 10 and 10A. Lower arrows AA and BB shown in FIGS. 2A and 11 indicate flow paths of hot air or cold air discharged from hair care devices 100 and 100A.

In FIG. 11, upper protruding electrode 23A of two protruding electrodes 23A arranged in the vertical direction is located at a position where the velocity of airflow is relatively low, and lower protruding electrode 23A is located at a position where the velocity of airflow is relatively high. In this configuration, when a discharge is generated between discharge electrode 1 and counter electrode 2A, the frequency of discharge generated by lower protruding electrode 23A increases, because it is considered that, for example, the higher the flow velocity, the more quickly air which is the material of the discharge reaction is replaced. That is, the frequency of discharge differs between upper protruding electrode 23A and lower protruding electrode 23A. As a result, there is a difference in electrolytic corrosion between them.

On the other hand, in FIG. 2B, two protruding electrodes 23 arranged in the lateral direction are located at positions where the airflow flows at substantially the same velocity (including the same velocity). Therefore, when a discharge is generated between discharge electrode 1 and counter electrode 2, the discharge is generated substantially uniformly (including uniformly) on two protruding electrodes 23. That is, the frequency of discharge is substantially the same (including the same) between two protruding electrodes 23. As a result, a difference in wear (difference in electrolytic corrosion) is unlikely to occur between them.

For the above reasons, it is preferable that the plurality of protruding electrodes 23 is arranged in flow path 300 of airflow generated by airflow generator 20 and at positions where the airflow flows at substantially the same velocity.

(4.3) Other Modifications

The mode of discharge adopted by discharge device 10 is not limited to the mode described in the exemplary embodiment described above. For example, discharge device 10 may employ a discharge in a mode in which a phenomenon where dielectric breakdown occurs due to development of a corona discharge is intermittently repeated, that is, discharge device 10 may employ an "entire breakdown discharge". In this case, when dielectric breakdown occurs due to development of a corona discharge, a relatively large discharge current momentarily flows through discharge device 10. As a result, immediately after that, the application voltage drops, and the discharge current is interrupted. Thereafter, the application voltage rises again, and dielectric breakdown occurs. Such phenomenon is repeated.

Further, the number of protruding electrodes 23 is not limited to two or four, and may be, for example, one, three, or five or more. This can extend the life of electrodes.

Further, in the exemplary embodiment and modifications mentioned above, a plurality of protruding electrodes 23 is arranged at equal intervals in the circumferential direction of opening 222 as an example, but the configuration in which the plurality of protruding electrodes 23 is arranged at equal intervals is not necessary. For example, a plurality of protruding electrodes 23 may be arranged at arbitrary intervals in the circumferential direction of opening 222.

Further, discharge device 10 may not include liquid supply unit 4 that generates charged fine particle water. In this case, discharge device 10 generates air ions by the partial breakdown discharge generated between discharge electrode 1 and counter electrode 2. Accordingly, when mounted on, for example, a dryer, discharge device 10 can increase an effect of managing hair due to generation of negative ions in addition to acidic components.

In addition, in comparison between two values such as a threshold and a target value, the wording "greater than or equal to" includes both a case where the two values are equal to each other and a case where one of the two values exceeds the other. However, the present disclosure is not limited thereto, and the wording "greater than or equal to" herein may have the same meaning as the wording "greater than" which includes only a case where one of the two values exceeds the other. In other words, whether the wording "greater than or equal to" includes the case where the two values are equal to each other can be arbitrarily changed depending on setting of a threshold or the like. Therefore, there is no technical difference between the wording "greater than or equal to" and the wording "greater than". Similarly, the wording "less than" may have the same meaning as the wording "less than or equal to".

(Summary)

As described above, discharge device (10; 10A) according to one aspect of the present disclosure includes discharge electrode (1), counter electrode (2; 2A to 2D), and voltage application unit (3). Counter electrode (2; 2A to 2D) faces discharge electrode (1) in a first direction (for example, the front-rear direction). Voltage application unit (3) generates a discharge by applying an application voltage between discharge electrode (1) and counter electrode (2; 2A to 2D). Counter electrode (2; 2A to 2D) includes dome-shaped electrode (22) and protruding electrode (23; 23A to 23D). Dome-shaped electrode (22) has recessed inner surface (221) recessed to a side opposite to discharge electrode (1) in the first direction. Protruding electrode (23; 23A to 23D) protrudes in a second direction (for example, lateral direction) intersecting the first direction from opening edge (222*a*) of opening (222) of dome-shaped electrode (22), opening (222) being provided at an end opposite to discharge electrode (1). Discharge device (10) forms discharge path (200) that has at least partial dielectric breakdown between discharge electrode (1) and protruding electrode (23; 23A to 23D) when the discharge occurs. Discharge path (200) includes first dielectric breakdown region (201) and second dielectric breakdown region (202). First dielectric breakdown region (201) is generated around discharge electrode (1). Second dielectric breakdown region (202) is generated around protruding electrode (23; 23A to 23D).

According to this aspect, discharge path (200) including first dielectric breakdown region (201) and second dielectric breakdown region (202) is formed between discharge electrode (1) and protruding electrode (23; 23A to 23D). With this configuration, the produced amount of acidic components can be increased as compared with the case of the corona discharge. In addition, an electric field can be concentrated on a tip of protruding electrode (23; 23A to 23D). Accordingly, the generated amount of ozone can be suppressed to the same extent as that in the corona discharge.

Further, in discharge device (10; 10A) according to one aspect of the present disclosure, counter electrode (2; 2A to 2D) includes a plurality of protruding electrodes (23; 23A to 23D). The plurality of protruding electrodes (23; 23A to 23D) is arranged at equal intervals along the circumferential direction of opening (222).

According to this aspect, in a case where a Taylor cone is formed at tip (11) of discharge electrode (1), a variation in shape of the Taylor cone can be reduced. As a result, a dielectric breakdown state of protruding electrodes (23; 23A to 23D) can be stabilized.

Further, in discharge device (10; 10A) according to one aspect of the present disclosure, the plurality of protruding electrodes (23; 23A; 23D) is a pair of protruding electrodes (23; 23A; 23D).

According to this aspect, an electric field can be concentrated on protruding electrodes (23; 23A; 23D). As a result, the discharge between discharge electrode (1) and protruding electrode (23; 23A; 23D) can be stabilized.

Further, in discharge device (10; 10A) according to one aspect of the present disclosure, the shape of protruding electrode (23; 23A to 23D) as viewed in the first direction is a triangle.

According to this aspect, an electric field can be concentrated on tip (230) of protruding electrode (23; 23A to 23D). As a result, the discharge between discharge electrode (1) and protruding electrode (23; 23A to 23D) can be stabilized.

Further, in discharge device (10; 10A) according to one aspect of the present disclosure, vertex angle (01) of the triangle is 60 degrees or more.

According to this aspect, when the shape of protruding electrode (23; 23A to 23C) is punched by using, for example, a punching die, damage of the die can be reduced as compared with a configuration where vertex angle (01) is less than 60 degrees.

Further, in discharge device (10; 10A) according to one aspect of the present disclosure, base (231) of the triangle which is the shape of protruding electrode (23; 23A to 23D) is longer than perpendicular line (233). Perpendicular line (233) is a straight line from vertex (232) facing base (231) to base (231).

According to this aspect, when the shape of protruding electrode (23; 23A to 23C) is punched by using, for example, a punching die, damage of the die can be reduced as compared with a configuration where base (231) is shorter than perpendicular line (233).

Further, in discharge device (10; 10A) according to one aspect of the present disclosure, the shape of opening (222) as viewed in the first direction is circular. Length (L2) of perpendicular line (233) is less than or equal to a half of radius (r1) of opening (222).

According to this aspect, when the shape of protruding electrode (23; 23A to 23C) is punched by using, for example, a punching die, damage of the die can be reduced as compared with a configuration where length (L2) of perpendicular line (233) is longer than a half of radius (r1) of opening (222).

Further, in discharge device (10; 10A) according to one aspect of the present disclosure, the triangle which is the shape of protruding electrode (23; 23A to 23D) as viewed in the first direction is isosceles triangle.

According to this aspect, in a case where a Taylor cone is formed at tip (11) of discharge electrode (1), an occurrence of a variation in shape of the Taylor cone can be suppressed without fine adjustment. As a result, a stable discharge can be obtained between discharge electrode (1) and protruding electrode (23; 23A to 23D).

Further, in discharge device (10; 10A) according to one aspect of the present disclosure, first dielectric breakdown region (201) and second dielectric breakdown region (202) are formed apart from each other in discharge path (200).

According to this aspect, a discharge current can be reduced as compared with a case where dielectric breakdown is caused in entire discharge path (200). As a result, wear of protruding electrode (23; 23A to 23D) due to electrolytic corrosion can be reduced.

Further, in discharge device (10; 10A) according to one aspect of the present disclosure, protruding electrode (23; 23A to 23D) may be inclined in a direction away from discharge electrode (1) in the first direction.

According to this aspect, a direction of force acting on discharge electrode (1) and liquid (40) retained on discharge electrode (1) can be controlled by adjusting inclination angle (02) of protruding electrode (23; 23A to 23D). In addition, the location where the electric field is concentrated on protruding electrode (23; 23A to 23D) can be adjusted.

Further, in discharge device (10; 10A) according to one aspect of the present disclosure, a surface facing discharge electrode (1) at tip (230) of protruding electrode (23; 23A to 23D) includes a curved surface.

According to this aspect, tip (230) of protruding electrode (23; 23A to 23D) where an electric field is concentrated has a curved surface, whereby wear due to electrolytic corrosion can be reduced. As a result, a desired discharge state can be maintained for a long period of time.

Further, in discharge device (10; 10A) according to one aspect of the present disclosure, counter electrode (2; 2A) includes a plurality of protruding electrodes (23; 23A). The plurality of protruding electrodes (23; 23A) is arranged in flow path (300) of an airflow generated by airflow generator (20) and at positions where the airflow flows at the same velocity.

According to this aspect, imbalance of electrolytic corrosion caused between the plurality of protruding electrodes (23; 23A) can be reduced.

In addition, hair care device (100; 100A) according to one aspect of the present disclosure includes discharge device (10; 10A) according to the above aspect and airflow generator (20). Airflow generator (20) generates an airflow with respect to discharge device (10; 10A).

According to this aspect, hair care device (100; 100A) capable of increasing a produced amount of acidic components can be achieved using discharge device (10; 10A) described above.

It should be noted that all of the configurations described in each aspect of discharge device (10; 10A) are not necessary for discharge device (10; 10A) and can be eliminated as appropriate.

INDUSTRIAL APPLICABILITY

The discharge device according to the present disclosure can be applied to various applications such as refrigerators, washing machines, hair care devices such as hair dryers, air conditioners, electric fans, air purifiers, humidifiers, facial equipment, and automobiles.

REFERENCE MARKS IN THE DRAWINGS

1 discharge electrode
2, 2A, 2B, 2C, 2D counter electrode
3 voltage application unit
4 liquid supply unit
5 housing
10, 10A discharge device
11, 40*a* tip
12 base end
20 airflow generator
21 electrode body
22 dome-shaped electrode
23, 23A, 23B, 23C, 23D protruding electrode
24 terminal piece
31 diode bridge
32 isolation transformer
33 capacitor
34, 35 resistor
40 liquid
41 cooling device
51 caulking projection
100, 100A hair care device
101 casing
102 grip
103 power cord
104 vent hole
200 discharge path
201 first dielectric breakdown region
202 second dielectric breakdown region

211 caulking hole
221 inner surface
**221*a*** first edge
**221*b*** second edge
222 opening
**222*a*** opening edge
230 tip
**230*a*** first curved surface
**230*b*** second curved surface
231 base
232 vertex
233 perpendicular line
300 flow path
321 primary winding
322 secondary winding
361, 362 input terminal
371, 372 output terminal
411 Peltier element
412 radiator plate
413 insulating plate
r1 radius
θ1 vertex angle
θ2 angle

The invention claimed is:

1. A discharge device comprising:
a discharge electrode;
a counter electrode that faces the discharge electrode in a first direction; and
a voltage application unit that applies an application voltage between the discharge electrode and the counter electrode to generate a discharge, wherein
the counter electrode includes:
a dome-shaped electrode recessed to a side opposite to the discharge electrode in the first direction, and
a protruding electrode that protrudes in a second direction intersecting the first direction from an opening edge of an opening of the dome-shaped electrode, the opening being provided at an end opposite to the discharge electrode,
the discharge device forms a discharge path having at least partial dielectric breakdown between the discharge electrode and the protruding electrode when the discharge occurs,
the discharge path includes:
a first dielectric breakdown region generated around the discharge electrode, and
a second dielectric breakdown region generated around the protruding electrode,
a shape of each of the plurality of the protruding electrodes when viewed in the first direction is a triangle, and
a base of the triangle is longer than a perpendicular line from a vertex facing the base to the base.

2. The discharge device according to claim 1, wherein the counter electrode includes a plurality of the protruding electrodes, the plurality of the protruding electrodes being arranged at equal intervals along a circumferential direction of the opening.

3. The discharge device according to claim 2, wherein the plurality of the protruding electrodes is a pair of the protruding electrodes.

4. The discharge device according to claim 1, wherein a vertex angle of the triangle is 60 degrees or more.

5. The discharge device according to claim 1, wherein
a shape of the opening when viewed in the first direction is circular, and
a length of the perpendicular line is less than or equal to a half of a radius of the opening.

6. The discharge device according to claim 1, wherein the triangle is an isosceles triangle.

7. The discharge device according to claim 1, wherein the first dielectric breakdown region and the second dielectric breakdown region are formed apart from each other in the discharge path.

8. The discharge device according to claim 1, wherein the each of the plurality of the protruding electrodes is inclined in a direction away from the discharge electrode in the first direction.

9. The discharge device according to claim 1, wherein the each of the plurality of the protruding electrodes has a curved surface on a surface facing the discharge electrode at a tip.

10. The discharge device according to claim 1, wherein the plurality of the protruding electrodes of the counter electrode is arranged in a flow path of an airflow generated by an airflow generator and at positions where the airflow flows at a same velocity.

11. A hair care device comprising:
the discharge device according to claim 1; and
an airflow generator that generates an airflow with respect to the discharge device.

12. The discharge device according to claim 1, wherein the protruding electrode protrudes in the second direction perpendicular to the first direction.

13. The discharge device according to claim 12, wherein the protruding electrode extends away from the dome-shaped electrode in the second direction.

14. The discharge device according to claim 1, wherein the opening of the dome-shaped electrode is formed in a circular shape when viewed in the first direction.

15. The discharge device according to claim 1, wherein the dome-shaped electrode has a curved line and the protruding electrode has a flat line in a cross-sectional view.

16. The discharge device according to claim 15, wherein an angle between a central axis of the discharge electrode and a protrusion direction of the protruding electrode is 90 degrees in a cross-sectional view.

* * * * *